(12) United States Patent
Zhang et al.

(10) Patent No.: US 11,585,675 B2
(45) Date of Patent: Feb. 21, 2023

(54) MAP DATA PROCESSING METHOD, COMPUTER DEVICE AND STORAGE MEDIUM

(71) Applicant: Tencent Technology (Shenzhen) Company Limited, Shenzhen (CN)

(72) Inventors: Jiulin Zhang, Shenzhen (CN); Bin Li, Shenzhen (CN); Cheng Luo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 429 days.

(21) Appl. No.: 16/751,068

(22) Filed: Jan. 23, 2020

(65) Prior Publication Data
US 2020/0158529 A1    May 21, 2020

Related U.S. Application Data

(63) Continuation of application No. PCT/CN2018/090479, filed on Jun. 8, 2018.

(30) Foreign Application Priority Data

Aug. 10, 2017 (CN) .......................... 201710682652.1

(51) Int. Cl.
*G01C 21/00* (2006.01)
*G01C 21/36* (2006.01)
(Continued)

(52) U.S. Cl.
CPC ....... *G01C 21/3881* (2020.08); *G01C 21/367* (2013.01); *G01C 21/3638* (2013.01);
(Continued)

(58) Field of Classification Search
CPC ............ G01C 21/3638; G01C 21/3881; G01C 21/367; G06F 16/29; G06T 19/003
See application file for complete search history.

(56) References Cited

U.S. PATENT DOCUMENTS 7,119,819 B1 * 10/2006 Robertson ........... G06F 3/04815
715/848
8,665,260 B2    3/2014 McCrae et al.
(Continued)

FOREIGN PATENT DOCUMENTS

CN        1702432 A      11/2005
CN      101415018 A       4/2009
(Continued)

OTHER PUBLICATIONS

Tencent Technology, ISRWO, PCT/CN2018/090479, Sep. 5, 2018, 7 pgs.
Tencent Technology, IPRP, PCT/CN2018/090479, Feb. 11, 2020, 6 pgs.

*Primary Examiner* — Nicholas Augustine
(74) *Attorney, Agent, or Firm* — Morgan, Lewis & Bockius LLP

(57) ABSTRACT

A map data processing method is performed at a computing device, the method including: detecting a positioning result updated in a three-dimensional space; determining a field of view area corresponding to the updated positioning result; obtaining a tile corresponding to the updated positioning result and a tile corresponding to the field of view area; dynamically loading, into an internal memory space, the tile corresponding to the updated positioning result, and the tile corresponding to the field of view area; and rendering, based on the loaded tiles, an image, in the three-dimensional space, located on the positioning result and corresponding to the field of view area.

20 Claims, 12 Drawing Sheets

(51) Int. Cl.
   *G06T 19/00*   (2011.01)
   *G06F 16/29*   (2019.01)
   *G06F 3/048*   (2013.01)
(52) U.S. Cl.
   CPC ......... *G01C 21/3878* (2020.08); *G06F 16/29*
                  (2019.01); *G06T 19/003* (2013.01)

(56)          References Cited

U.S. PATENT DOCUMENTS

| | | | | |
|---|---|---|---|---|
| 9,996,797 | B1* | 6/2018 | Holz | G06F 3/0304 |
| 10,529,143 | B2* | 1/2020 | Bell | H04N 13/156 |
| 2014/0146394 | A1* | 5/2014 | Tout | G02B 26/10 |
| | | | | 359/630 |
| 2015/0091903 | A1* | 4/2015 | Costello | G06T 15/60 |
| | | | | 345/426 |
| 2018/0224945 | A1* | 8/2018 | Hardie-Bick | G06T 19/006 |
| 2019/0206115 | A1* | 7/2019 | Tytgat | G06T 15/20 |
| 2019/0385324 | A1* | 12/2019 | Kume | H04N 5/23218 |
| 2021/0183158 | A1* | 6/2021 | Korngold | G06T 15/60 |

FOREIGN PATENT DOCUMENTS

| | | | |
|---|---|---|---|
| CN | 103136950 | A | 6/2013 |
| CN | 103389104 | A | 11/2013 |
| CN | 103593861 | A | 2/2014 |
| CN | 104135715 | A | 11/2014 |
| CN | 104933057 | A | 9/2015 |
| CN | 107016924 | A | 8/2017 |
| CN | 107423445 | A | 12/2017 |
| JP | 2001201355 | A | 7/2001 |
| JP | 2007133489 | A | 5/2007 |
| JP | 2016192205 | A | 11/2016 |

\* cited by examiner

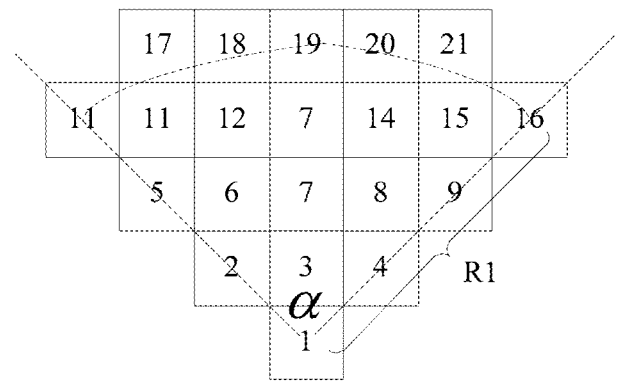
FIG. 4
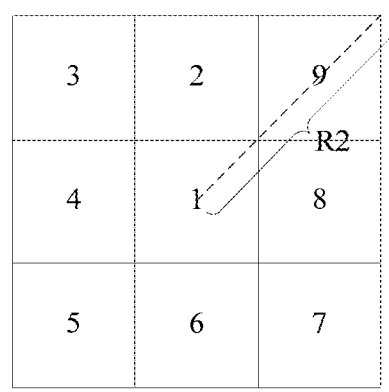
FIG. 5
FIG. 6

MAP DATA PROCESSING METHOD, COMPUTER DEVICE AND STORAGE MEDIUM

CROSS-REFERENCE TO RELATED APPLICATIONS

This application is a continuation application of PCT/CN2018/090479, entitled "MAP DATA PROCESSING METHOD, COMPUTER DEVICE AND STORAGE MEDIUM" filed on Jun. 8, 2018, which claims priority to Chinese Patent Application No. 201710682652.1, entitled "MAP DATA PROCESSING METHOD, APPARATUS AND STORAGE MEDIUM" filed with the China National Intellectual Property Administration on Aug. 10, 2017, both of which are incorporated by reference in their entirety.

FIELD OF THE TECHNOLOGY

This application relates to an electronic map technology, and in particular, to a map data processing method, a computer device and a storage medium.

BACKGROUND OF THE DISCLOSURE

An electronic map is an outcome of fusing a conventional map with a computer technology, a geographic information system (GIS) technology, and a network technology, and is a modern information product in which a visual digital map is used as a background, and a plurality of mediums such as a text, a picture, a chart, a sound, an animation and a video are used as representation means to comprehensively present a comprehensive feature of an area such as a region, a city, or a tourist attraction, breaks through temporal and spatial limitations on the conventional paper map, and has richer information content and a wider application range.

When the electronic map is used, as a positioning location changes, map data required for rendering also changes. There is currently no effective technical solution about how to quickly obtain matching map data according to the change in the positioning location and perform rendering and output.

SUMMARY

Embodiments of this application provide a map data processing method, a computer device, and a storage medium.

A map data processing method is provided, performed in a computer device including a memory and a processor, the method including:

detecting a positioning result updated in a three-dimensional space;

determining a field of view area corresponding to the updated positioning result;

obtaining a tile corresponding to the updated positioning result and a tile corresponding to the field of view area;

loading, into an internal memory space, the tile corresponding to the updated positioning result, and the tile corresponding to the field of view area; and rendering, based on the loaded tiles, an image, in the three-dimensional space, located on the positioning result and corresponding to the field of view area.

A computing device is provided, including a memory and a processor, the memory storing computer-readable instructions, and the computer-readable instructions, when executed by the processor, causing the processor to perform the aforementioned map data processing method.

A non-volatile computer-readable storage medium is provided, storing computer-readable instructions, the computer-readable instructions, when executed by one or more processors, causing the one or more processors to perform the aforementioned map data processing method.

Details of one or more embodiments of this application are provided in the following accompanying drawings and descriptions. Other features, objectives, and advantages of this application become more obvious with reference to the specification, the accompanying drawings, and the claims.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

FIG. 4 is a schematic diagram of a field of view area according to an embodiment of this application;

FIG. 5 is a schematic diagram of another field of view area according to an embodiment of this application;

FIG. 6 is a schematic diagram of loading and deleting a tile according to an embodiment of this application;

DESCRIPTION OF EMBODIMENTS

Figure 1:
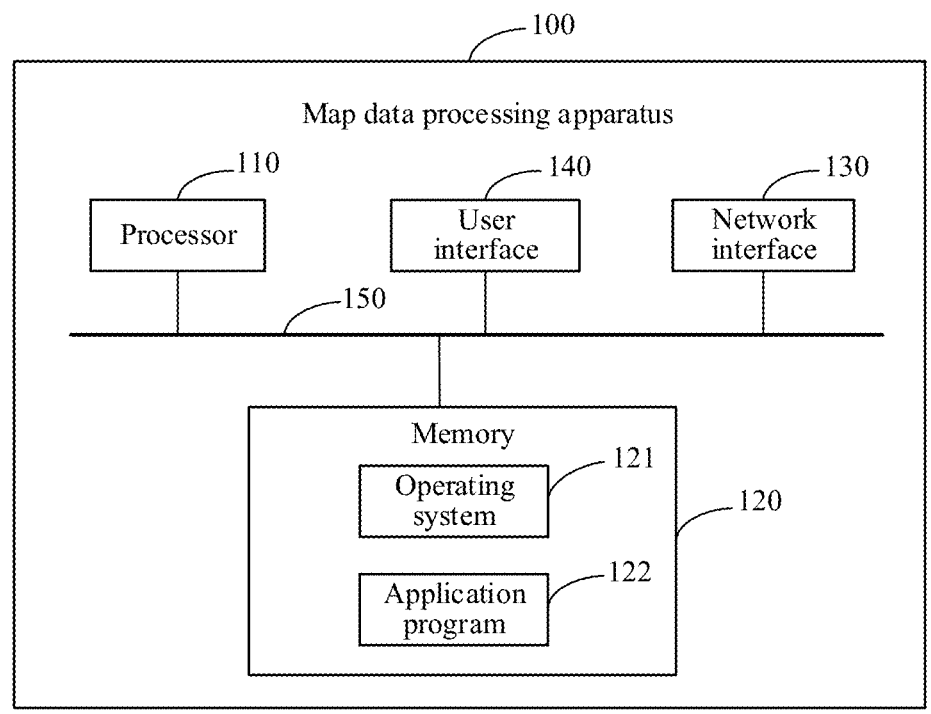
FIG. 1 is a schematic implementation flowchart of a map data processing method according to an embodiment of this application.

To make objectives, technical solutions, and advantages of this application clearer, this application is further described below in detail with reference to accompanying drawings. The embodiments to be described are a part rather than all of the embodiments of this application. All other embodiments obtained by persons skilled in the art based on the embodiments of this application without creative efforts shall fall within the protection scope of this application.

Before this application is further described in detail, nouns and terms provided in the embodiments of this application are described. The nouns and terms provided in the embodiments of this application are applicable to the following explanations.

1. Cartographic database: it is a database based on map digitalization data, and stores a digital information file of elements (for example, a control point, a landform, a land type, a habitation, hydrology, vegetation and transportation) of map content.

2. Tile: it is also referred to as a vector tile (also referred to as a map tile). In this specification, a tile is provided in a text file form. For example, a three-dimensional space map of a cartographic database such as an OSM is divided according to a particular size, and then encoded into a text file based on a data interchange language, and information, for example, a geometrical shape such as a building, a road, and a river in a corresponding map area, and a corresponding building name, road name and point of interest (POI) is described in the text file.

A tile is of a format of various data languages, for example, JavaScript Object Notation (JSON), or of a format of eXtensible Markup Language (XML).

3. Tile database: it is a database storing tiles.

4. Internal memory space: it is a space allocated to an application program and used for storing data.

5. Open street map (OSM): it is a free, open-source, and editable tile database jointly maintained by mass cyber citizens.

6. Client: in this specification, it is an application program installed in advance in a device, or a third-party application program in a device, for example, an instant messaging (IM) application program and a browser, and is provided with a tile rendering engine (for example, Unity3D), to splice tiles requested from the tile database and render an image of a three-dimensional space.

7. Device: it is an electronic device supporting running of an application program, for example, a smartphone, a tablet computer, a notebook computer, an augmented reality (AR) device for superimposing a real object and a virtual object in real time, and a virtual reality (VR) device for simulating a virtual world of a three-dimensional space. In this specification, a device in which a client is installed is also referred to as a host device of the client.

8. Three-dimensional space: it is solid, and is a spatial solid formed by three dimensions. For example, both a three-dimensional electronic map and a street view map are three-dimensional spaces.

9. Rendering: it is a process in which the rendering engine of the client generates an image according to a text file of a tile and outputs the image to a screen. To reflect a space sense, a rendering program needs to perform some "special" operations, that is, determining which object is in the front, which object is in the rear, which object is blocked and the like.

10. First angle of view: it means that an objective thing is observed or described at an angle at which a narrator personally sees with his/her own eyes. For example, in a game scene, a narrator watches an entire game demonstration at a personal angle of view of a game operator, which is equivalent to standing behind the operator and seeing, and what is seen by oneself is what is seen by the operator. A more visualized and more immersive experience is provided. Moreover, each subtle operation of the operator can be observed.

11. Third angle of view: it means that an objective thing is observed or described from an angle of a third party. For example, when a role controlled in a game is watched at an angle of a third party, the whole body of the role and a surrounding environment can be seen; or when a navigation picture about oneself in a map software picture is watched at an angle of a third party, a location of the oneself and a surrounding environment can be seen.

The embodiments of this application provide a map data processing method, a map data processing apparatus for implementing a map data processing method, a computer device, and a storage medium. The map data processing apparatus may be implemented in various forms, for example, various devices such as a desktop computer, a notebook computer, a smartphone, an AR device and a VR device. The hardware structure of the map data processing apparatus of the embodiments of this application is further described below.

FIG. 1 is a schematic diagram of a hardware structure of a map data processing apparatus 100 implementing each embodiment of this application. In actual application, the map data processing apparatus may be implemented as the foregoing various devices in which a client is run. The map data processing apparatus 100 shown in FIG. 1 includes: at least one processor 110, a memory 120, at least one network interface 130 and a user interface 140. Various components in the map data processing apparatus 100 are coupled together by using a bus system 150. It may be understood that, the bus system 150 is configured to implement connection and communication between the components. In addition to a data bus, the bus system 150 further includes a power bus, a control bus, and a state signal bus. But, for ease of clear description, all types of buses in FIG. 1 are marked as the bus system 150. The memory includes a non-volatile storage medium and an internal memory. The non-volatile storage medium of the computer device stores an operating system, and may further store a computer-readable instruction. When the computer-readable instruction is executed by the processor, the processor may be caused to perform the map data processing method. The internal memory may also store computer-readable instructions. The computer-readable instructions, when executed by the processor, may cause the processor to perform the map data processing method.

The user interface 140 may be implemented as a display, a keyboard, a touch panel, a touchscreen or the like according to a requirement.

It may be understood that, the memory 120 may be a volatile memory or a non-volatile memory, or may include both a volatile memory and a non-volatile memory. The memory 120 described in this embodiment of this application aims to include but is not limited to these memories and any other suitable type of memory.

The memory 120 in this embodiment of this application is configured to store various types of data to support operation of the map data processing apparatus 100. Examples of these types of data include any computer program to be operated on the map data processing apparatus 100, for example, an operating system 121 and an application program 122.

The operating system 121 includes various system programs, for example, a frame layer, a core library layer, and a drive layer, used for implementing various basic services and processing tasks based on hardware. The application program 122 may include various application programs. A program implementing the map data processing method provided in the embodiments of this application may be included in the application program 122 to serve as a function module, and certainly may also be provided as an application program specially used for map data processing.

The map data processing method provided in the embodiments of this application may be applied to the processor 110, or implemented by the processor 110, implemented in a manner based on pure hardware, or implemented in a manner based on a combination of software and hardware.

For the implementation based on pure hardware, the processor 110 may be an integrated circuit chip and has a signal processing capability. During implementation, steps of the map data processing method provided in the embodiments of this application may be completed through a hardware integrated logic circuit in the processor 110. For example, in an exemplary embodiment, a hardware decoding processor configured to implement the map data processing method provided in the embodiments of this application may be built in the map data processing apparatus 100, for example, an application specific integrated circuit (ASIC), a complex programmable logic device (CPLD), or a field-programmable gate array (FPGA).

For the implementation based on a combination of software and hardware, the processor 110 may be implemented by combining a general-purpose processor and a software module. The software module may be located in a storage medium, the storage medium is located in the memory 120, and the processor 110 reads data in the memory 120 and performs the map data processing method provided in the embodiments of this application in combination with hardware of the processor 110.

Figure 2A:
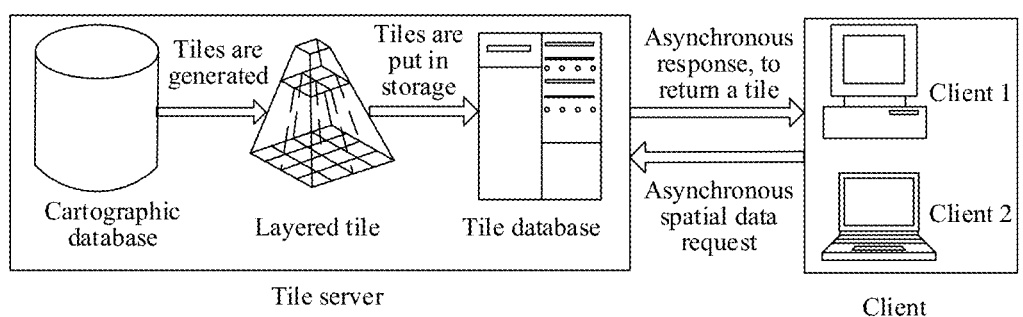
FIG. 2A is a schematic diagram of an optional application scenario of a map data processing apparatus according to an embodiment of this application.
Figure 2B:
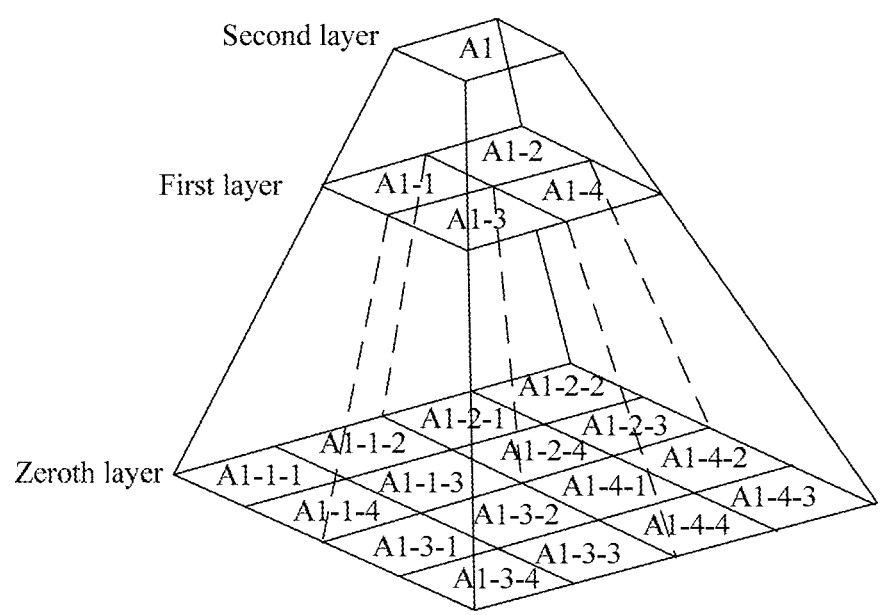
FIG. 2B is an optional schematic diagram of tiles at different layers according to an embodiment of this application.
Figure 2C:
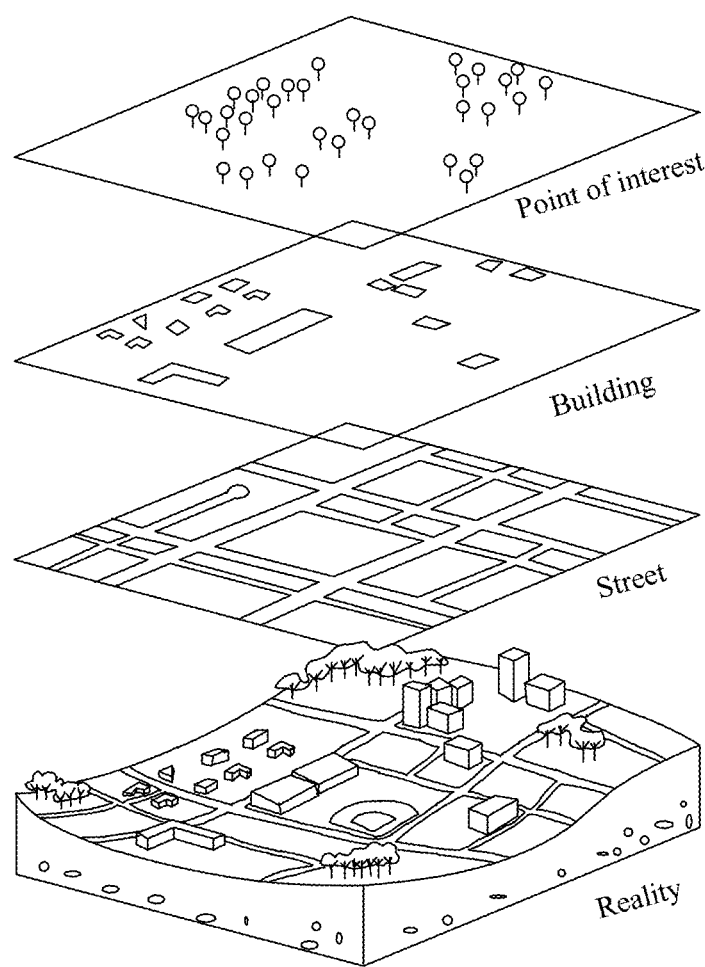
FIG. 2C is an optional schematic diagram of division of different map layers according to an embodiment of this application.
Figure 2D:
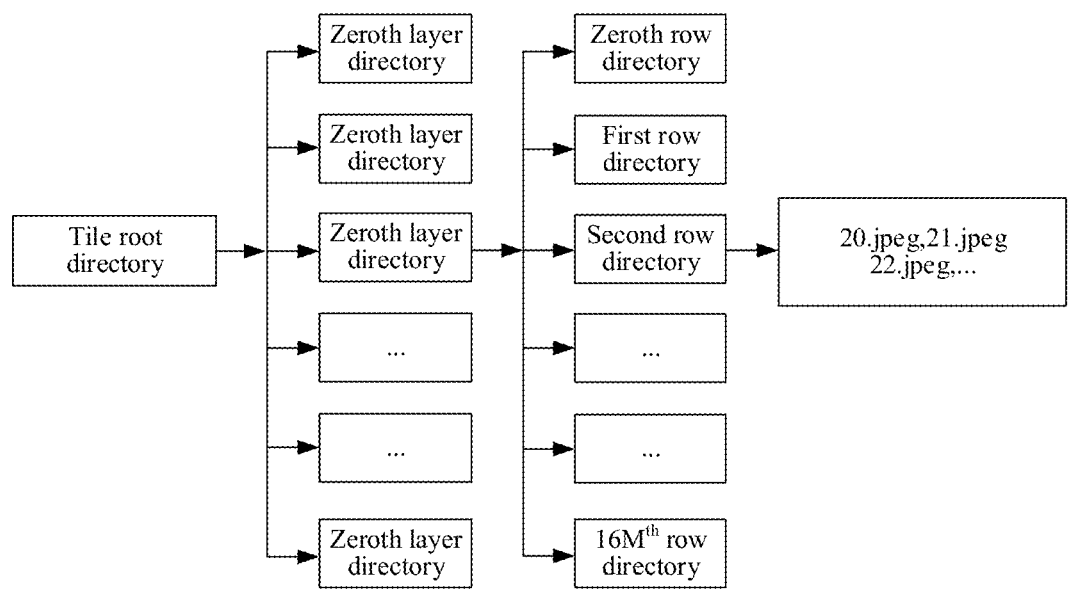
FIG. 2D is a schematic diagram of an optional storage structure of storing map data as a tile according to an embodiment of this application.

Exemplary processes of storing, obtaining and rendering a tile are described below according to FIG. 2A to FIG. 2D and by using an example in which a tile is a map tile. FIG. 2A is a schematic diagram of an optional application scenario of a map data processing apparatus according to an embodiment of this application; FIG. 2B is an optional schematic diagram of tiles at different layers according to an embodiment of this application; FIG. 2C is an optional schematic diagram of division of different map layers according to an embodiment of this application; FIG. 2D is a schematic diagram of an optional storage structure of storing map data as a tile according to an embodiment of this application. Descriptions are performed respectively with reference to the accompanying drawings.

With reference to the description of FIG. 2A, the figure relates to a tile building and display process, and details are described as follows:

1. A client requests to obtain a tile from a tile server.

When a user enables map software, or game software about a geographic location service, a request for obtaining a tile is transmitted to the tile server according to an actual requirement. For example, there are requirements about a quantity of types of proportional scales under which the user needs to display data, and an area in an original image in which the user needs to display data, and for tile map data, the original image is divided according to these requirements and map data is extracted.

2. The tile server extracts map data from the cartographic database and performs tiling.

Herein, the tile server tiles the map data according to a displayed proportion. As shown in FIG. 2A, an uppermost layer is a level of tiles that are extracted and obtained through division and whose proportional scale is minimum, for example, 1:50000; and a lowermost layer is a level of tiles whose proportional scale is maximum, for example, 1:12500.

Usually, a map with a large proportional scale has detailed content and high geometrical precision; and a map with a small proportional scale has strong content summarization. Therefore, a larger proportional scale includes a smaller image range, and presents more detailed content; and a smaller proportional scale includes a larger image range.

3. The tile server stores tiles into the tile database.

After a tile map is built, tiles are stored into the tile database, so that when the user displays the map in a zoom-in or zoom-out manner, the user can obtain a corresponding level of tiles from the server in time, to improve display efficiency of the map.

4. The tile server transmits a tile to the client.

When the user zooms in or zooms out the map, the client finds corresponding tiles at the corresponding level from a built tile cache, and then splices and renders these requested tiles, so as to obtain tiles within a visible range at the level that is required by the user.

Moreover, the map data may be tiled in advance according to an actual requirement of the user, so as to be downloaded by the user and used offline. Therefore, when the user needs to perform navigation, the user only needs to extract, from a local database, a tile matching the positioning result, to avoid a problem that navigation cannot be performed because of a poor network, and improve efficiency of positioning navigation.

With reference to the description of FIG. 2B, the figure represents a pyramidal (layered) model of a tile map, where the model is a multi-resolution layered model. From a bottom layer to a top layer of the tile pyramid, resolutions are increasingly low, but represented geographic ranges are unchanged.

Currently, map services seen in an Internet open service or an APP of most of intelligent terminals are all based on a mesh (that is, tile) model. For example, a description of each place in an electronic three-dimensional map seen by a user is actually formed by more than 10 layers of pictures or even more than 20 layers of pictures. When the user performs scaling, corresponding tile pictures are selected according to a scaling level and spliced into a complete map. In a general open service, each tile picture is downloaded from the server, and therefore when the network speed is low, the user can see this process of switching and splicing different tiles with his/her own eyes see.

As shown in FIG. 2B, the proportional scale of the zeroth layer may be 1:12500, the proportional scale of the first layer may be 1:25000, and the proportional scale of the second layer may be 1:50000. The pyramid model of the tile map may be divided into a plurality of layers of tiles according to different proportional scales, and is not merely limited to the three layers of FIG. 2B.

Steps of a map tiling method are as follows: First, a quantity N of scaling levels provided by a map service platform is determined, a map picture whose scaling level is lowest, that is, whose map proportional scale is maximum is used as a bottom layer of a pyramid, that is, the zeroth layer, the zeroth layer is partitioned, and the map picture is cut from left to right starting from the upper left corner of the map picture, and divided into square tiles of the same size, to form tile matrices of the zeroth layer, for example, tile matrices such as A1-1-1 to A1-1-4, A1-2-1 to A1-2-4, A1-3-1 to A1-3-4, and A1-4-1 to A1-4-4 shown in FIG. 2B; second, on the basis of the map picture of the zeroth layer, a map picture of the first layer is generated according to a method of combining each 2×2 pixels into one pixel, is partitioned, and is divided into square tiles having the same size as that of a next layer, to form tile matrices of the first layer, for example, four tiles A1-1-1 to A1-1-4 are combined into a tile A1-1, the rest can be deduced by analogy, and tiles A1-2, A1-3 and A1-4 are obtained through combination, thereby forming the tile matrices of the first layer as shown in FIG. 2B; and using the same method, a tile of the second layer is obtained through combination based on the map pictures of the first layer, for example, four tiles A1-1, A1-2, A1-3 and A1-4 are combined into a tile A1, thereby forming a tile matrix of the second layer as shown in FIG. 2B until the $(N-1)^{th}$ layer, to form the entire tile pyramid.

Additionally, with reference to the description of FIG. 2C, a tile map in an electronic map may include the following different layers:

1. Map layer (TMXLayer).

For a tile model, the concept of layer is relatively important. Because a layer is generated, elements included in each layer are relatively fixed, where the map layer includes layers of most basic and most frequently used map data elements, for example, a street, a building, a river, a bridge and a green space, and even some base maps include an outline of a building or another ground object, as shown in FIG. 2C. On the basis of a base map, various required layers may be superimposed, so as to satisfy an application requirement, for example, a layer of a road traffic jam situation, a satellite layer and a POI layer.

The base map is usually a whole set of map of different resolutions rendered by selecting necessary map vector data, and then setting a color, a font, a display manner, a display rule and the like through operations of a map art designer.

2. Object layer (TMXObjectGroup).

Herein, a scene for a location based service further includes an object layer, where the object layer is used for adding information about map elements other than the background, for example, a dynamic special effect of a prop or a barrier, so that when a positioning result of a virtual object is updated, interaction with the virtual object can be achieved.

With reference to the description of FIG. 2D, tiles are correspondingly stored in the tile database according to different levels, for example, the zeroth level, the zeroth to $16M^{th}$ row directories under the zeroth level and image or text data under the row directories.

Herein, in the map data, a tile in a level is represented by using a row number and a column number, and then data in the tile is encoded; and after the encoding, the tile is stored. In this embodiment of this application, a tile is represented by using a text file in a text file (for example, XML or JSON format) form, where the tile includes a metadata table, a tiles data table, a geometries object table and an attributes information table, and a view file, for example, a tile features view and a tile geometries view. The view file is generated from data in the tiles data table, the geometries object table and the attributes information table, and for attribute information of a geographic element that does not need to be obtained, a query speed based on tile geometries is higher.

The tiles data table includes all vector tile data and a value used for positioning a tile, and includes fields in the following Table 1:

TABLE 1

Tiles data table

| Field name | Data type | Description |
| --- | --- | --- |
| resolution | varchar | resolution corresponding to a tile |
| tile_column | integer | tile column number |
| tile_row | integer | tile row number |

The geometries object records geometrical information of a geographic element in a tile, and according to display proportions, different tile objects may be completely or partially displayed. The geometries object table includes fields in the following Table 2:

TABLE 2

Geometries object table

| Field name | Data type | Description |
| --- | --- | --- |
| layer | Text | layer name |
| fid | Long | geographic element ID |
| tile_id | Text | tile ID |
| geometry_data | Text | geometrical object |

The attributes information table records attribute information of geographic elements, and includes fields in the following Table 3:

TABLE 3

Attributes information table

| Field name | Data type | Description |
| --- | --- | --- |
| layer | Text | layer name |
| fid | Long | geographic element ID |
| attr_data | Text | attribute data |
| search_values | Text | query content |

After the tile map data is stored, steps of the tile obtaining method are described as follows: 1. Before a tile is obtained, positioning information, for example, a location of a user in a real world (for example, coordinates of various coordinate systems), or a location of a game role in a virtual map is obtained, and then map data of the to-be-extracted tile is determined according to a relationship between the obtained positioning information and the tile. 2. When the tile is obtained, a tile of a corresponding level is obtained according to a proportional scale (that is, a scaling proportion) of current display of the client, that is, according to an actual requirement of the client, the cartographic database returns only a tile that is stored in a text file form and that is related to a requested location and the corresponding level, so as to avoid a situation of ineffective obtaining.

Figure 3:
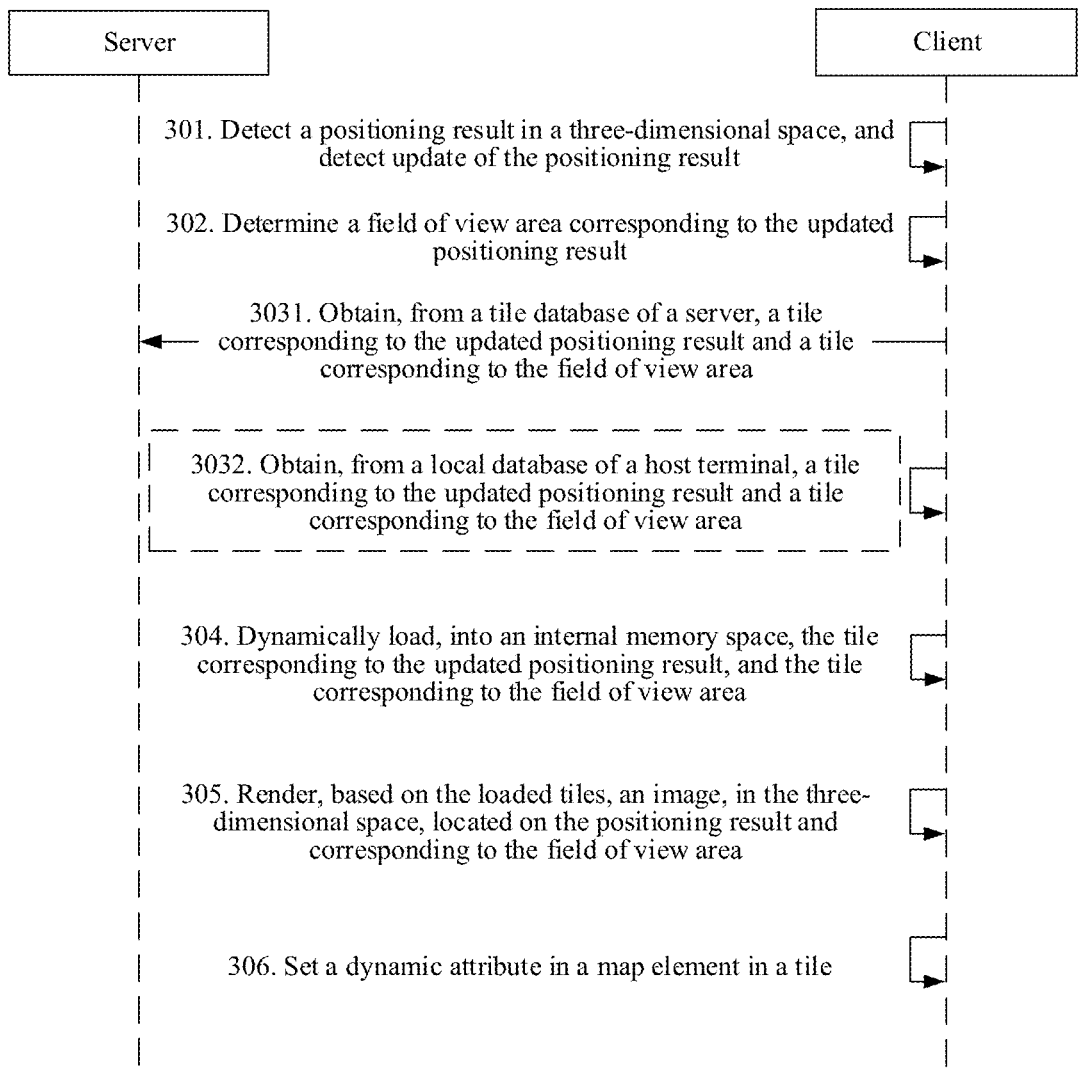
FIG. 3 is a schematic implementation flowchart of a map data processing method according to an embodiment of this application.

FIG. 3 is a schematic implementation flowchart of a map data processing method according to an embodiment of this application. As shown in FIG. 3, the map data processing method according to this embodiment includes the following operations:

Step 301: Detect a positioning result updated in a three-dimensional space.

Specifically, a client may detect a positioning result in a three-dimensional space, and detect update of the positioning result.

The client in this embodiment of this application may be applied to an AR/VR device+an electronic map and a game of a location based service, and a conventional intelligent electronic device+an electronic map and a game of a location based service. Therefore, the client may detect a positioning result in the three-dimensional space through the AR/VR device or the conventional intelligent electronic device, so as to perform a subsequent operation according to the positioning result.

For the positioning result, using an example in which the client is initialized, the client loads a tile on a default location during initialization, for example, a tile of the current positioning result, or a tile of a positioning result obtained last time when the client ends running last time. The client needs to render a latest positioning result and an image of a corresponding field of view area in real time according to the positioning result. Therefore, whether the positioning result is updated is detected at a fixed time interval or at an unfixed time interval (for example, triggered based on a particular event).

For the two applications, namely, an electronic map and a game of a location based service, the former is usually used for navigation in a real world, the latter is usually used for navigation in a virtual environment, and scenarios of the two applications are introduced as follows:

Scenario 1: navigation in a real world.

It is applied to a conventional intelligent electronic device+an electronic map of a location based service, and AR+an electronic map of a location based service.

For example, a user usually uses navigation in daily life, for example, may use, when going out for a trip or working or living at a strange place, various navigation manners such as a conventional navigation manner, that is, perform positioning in a real world by using a mobile phone or another intelligent device in which an electronic map is installed, to obtain a travelling route for reaching a destination, for example, reaching, according to navigation, Beijing from Shenzhen in which the user is currently located.

Moreover, the user may further perform navigation by using an AR device+an electronic map of a location based service, and while displaying an image of a real world in which the user is located, the AR device superimposes a virtual image carrying navigation information.

Herein, AR navigation in this embodiment of this application continues to be described. AR navigation is: when a user is making a drive, a required navigation image and real-time road condition information are displayed through a particular AR device worn by the user such as intelligent glasses; or a required navigation image and real-time road condition information are displayed on a windscreen of an automobile by applying a special coating to a surface of the windscreen, and for the user making a drive, it seems that the navigation image is directly superimposed onto a road.

Scenario 2: navigation in a virtual environment.

It is applied to navigation of a virtual character in an online or offline game. For example, a user plays a game by using a mobile phone, a computer, an AR device, or a VR device, and controls running and/or fighting of a virtual character in the game. For example, a user touches a screen through a finger to control a virtual character in a game to perform a corresponding running or fighting operation; or when playing a game by using an AR or VR device, a user controls a currently performed running or fighting operation through a control rod or control glove in the AR or VR device.

Therefore, according to different application scenarios, the obtaining the positioning result in the three-dimensional space may be divided into the following two situations:

1. Perform positioning in a real environment.

In an embodiment, a positioning service is invoked to detect a positioning result, in a real three-dimensional space, of a host device of a client at a fixed time interval, that is, a real-time location of a user in a real world is obtained.

For example, in real life, when a user performs positioning or navigation by using a mobile phone, an AR device or a VR device, the client obtains in real time, according to a positioning system in the foregoing device, for example, a global satellite navigation system (GPS) or a base station positioning system, location information of the user in the real three-dimensional space, for example, a longitude and a latitude of the user, so that the client obtains, according to the location information, a tile matching the corresponding positioning result from the tile database.

2. Perform positioning in a virtual environment.

In an embodiment, the client detects a positioning result, in a virtual three-dimensional space, of a virtual object in a client at a fixed time interval, that is, obtains a real-time location, in a virtual world, of a virtual object in a game.

For example, when a user plays a game by using a mobile phone, and touches a screen through a finger to control a virtual object in the game to perform a corresponding running or fighting operation; or when a user plays a game by using an AR or VR device, and controls a currently performed running or fighting operation through a control rod or control glove in the AR or VR device, a location of the virtual object in a virtual map in the game changes. In this case, through a particular positioning manner of the virtual object, the positioning result, in the virtual three-dimensional space, of the virtual object in the client is detected in real time, thereby obtaining the location of the virtual object in the virtual map, and obtaining a matching tile from the tile database through the location. When the location of the virtual object changes, a tile corresponding to the location change is updated in real time. In this case, display of the virtual map also has a corresponding change accordingly.

Step 302: Determine a field of view area corresponding to the updated positioning result.

During positioning or navigation, to ensure that a user can view information in a field of view area, the information may be a road, a road traffic situation, a building and the like, and therefore, a field of view area of a real user or a virtual object needs to be determined, so as to obtain a tile corresponding to the field of view area, and then display a map corresponding to the field of view area.

For different electronic devices, display manners are all different, and therefore, field of view areas are also different. A display manner for an AR/VR device is performing display at a first angle of view, and a presented field of view area is a sector area; and a conventional intelligent electronic device usually performs presentation at a third angle of view, and a presented field of view area is an area having a positioning result as a center. Therefore, the determining the field of view area in step 302 may be implemented in the following two manners:

Manner 1: Determine, by using the positioning result as a reference in the three-dimensional space, a field of view area that is located at a preset angle of view and whose distance from the positioning result is less than a predetermined distance.

Herein, the manner 1 is applicable to navigation of the AR/VR device.

An orientation of the user, for example, an east orientation, a west orientation, a south orientation or a north orientation may be determined according to a gyroscope in the AR/VR device. Therefore, using the positioning result as a reference, a field of view area that is located at a preset angle of view α and whose positioning result is less than a predetermined distance R1 is determined with reference to the orientation of the user. It may be seen that, the field of view area is a sector area that has the positioning result as a reference, is at an angle of α and has a radius of R1, as shown in FIG. 4. Blocks having different numerical mark numbers in FIG. 4 represent different tiles, a block whose mark number is 1 is a tile of a positioning result, and blocks whose mark numbers are 2 to 21 are tiles of a field of view area. The magnitude of the preset angle of view α may be 60 degrees to 120 degrees, and the predetermined distance R1 may be a value from 1 kilometer (km) to 10 km. When the magnitude of a value is set, the magnitude of the value may be determined according to an actual situation. This is not specifically limited in this embodiment of this application.

Manner 2: Determine, by using the positioning result as a center in the three-dimensional space, a field of view area whose distance from the positioning result is less than a predetermined distance.

Herein, the manner 2 is applicable to positioning or navigation of a conventional intelligent electronic device.

Using a positioning result as a center, a field of view area at a distance from the positioning result less than a predetermined distance R2 is determined. It may be seen that, the field of view area is a round area that has the positioning result as the center and has a radius of R, as shown in FIG. 5. A block whose mark number is 1 in FIG. 5 is a tile of a positioning result, and blocks whose mark numbers 2 to 5 are tiles of a field of view area. The predetermined distance R2 may be a value from 1 kilometer to 10 km. When the magnitude of a value is set, the magnitude of the value may be determined according to an actual situation. This is not specifically limited in this embodiment of this application.

Step 303: Obtain a tile corresponding to the updated positioning result and a tile corresponding to the field of view area.

For sources of tiles, a tile obtaining manner may be divided into the following two manners or steps:

Step 3031: Obtain, from a tile database of a server, a tile corresponding to the updated positioning result and a tile corresponding to the field of view area.

In an embodiment, for a terminal whose storage space is relatively small or whose computing capability is not strong, the server may maintain the tile database, and the client may obtain, from the tile database of the server, a tile matching the corresponding positioning result. For example, storage of the map data in the host device of the client occupies storage space of the host device. Therefore, the map data is stored in the server, and obtained from the server in a networking manner each time the client obtains a tile, thereby avoiding a case in which a large quantity of storage space of the host device is occupied because the map data is large.

Step 3032: Obtain, from a local database of a host terminal, a tile corresponding to the updated positioning result and a tile corresponding to the field of view area.

In an embodiment, for a terminal whose computing capability is relatively strong, for example, a personal computer (PC), a tile matching a corresponding positioning result may be obtained from the local database of the host terminal, and the tile database is maintained locally. For example, when the map data is stored in the host device of the client (that is, a local end), a tile matching a corresponding positioning result is obtained from the local database of the host terminal each time the tile is obtained, to avoid a problem that navigation cannot be performed because of a poor network.

During positioning or navigation, a round trip may occur. For example, during navigation, because of a situation, a user needs to go back after going by a short distance; or when a user is operating a game, a virtual object in the game goes from place A to place B, and then returns to place A from place B. In this case, the internal memory space may have stored a tile associated with a historical positioning result. Therefore, when a tile corresponding to a positioning result and a tile corresponding to a field of view area are obtained, whether the positioning result is updated for the first time needs to be judged. When the positioning result is not updated for the first time, whether the positioning result is the same as the historical positioning result is judged.

In an embodiment, the tile corresponding to the updated positioning result and the tile corresponding to the field of view area are requested from a tile database when the updated positioning result is detected for the first time; and the internal memory space is first queried for the tiles when the updated positioning result is the same as a historical positioning result, and the tile corresponding to the updated positioning result and the tile corresponding to the field of view area are requested from the tile database only when no tile is found, so as to shorten the tile obtaining time.

Each tile reflects geographic information of an area, and therefore if a tile A reflects geographic information of an area A, a positioning result of each time of positioning in the area A corresponds to the tile A. To avoid a case in which tiles are frequently invoked from the cartographic database when a positioning result is updated (that is, location information is updated), before the tiles matching the positioning result and the field of view area are obtained, whether the positioning result is obtained for the first time is judged.

If yes, the tiles matching the corresponding positioning result and field of view area are requested from the tile database; or if not, the internal memory space is queried for the tiles matching the corresponding positioning result and field of view area, and when no tile is found, the tiles matching the corresponding positioning result and field of view area requested from the tile database.

For example, the tile A corresponds to information about locations whose serial numbers are 1 to 100. When a positioning result obtained for the first time is a location whose serial number is 1, because the internal memory space does not store the tile A, the client requests, from the tile database, a tile matching the corresponding positioning result. When the positioning result is updated to any one of locations whose serial numbers are 2 to 100, because information about each of the locations whose serial numbers are 2 to 100 corresponds to the tile A, and the tile A has been stored in the internal memory space, only the internal memory space needs to be queried for the matching tile A. When the positioning result is updated to a location whose serial number is greater than 100, and no matching tile A is found in the internal memory space, the tile matching the corresponding positioning result is requested from the tile database. Therefore, a case in which tiles are frequently invoked from the cartographic database because the positioning result is updated (that is, the location information is updated) is avoided, thereby improving map display efficiency.

Therefore, for the foregoing obtaining a tile, only when a positioning result exceeds a particular area (for example, the area A), a corresponding tile is obtained according to the positioning result.

For each of some mainstream map application programming interfaces (API), in a manner in which a terminal of a client requests a map picture of an area and a server returns map pictures rendered in advance, the client splices the map pictures, but transmission of the map pictures needs to consume more traffic.

A solution of the embodiments of this application is applied. A map picture is stored in a JSON format form. Therefore, each time the positioning result is updated, only the updated positioning result and a text file in the JSON format corresponding to the field of view area need to be obtained, and the text file in the JSON format is usually relatively small, to effectively reduce transmission traffic consumption, and facilitate quick loading of the map.

Step 304: Load, into an internal memory space, the tile corresponding to the updated positioning result, and the tile corresponding to the field of view area.

Specifically, the client may dynamically load, into an internal memory space, the tile corresponding to the updated positioning result, and the tile corresponding to the field of view area. For example, if a tile corresponding to a positioning result has a serial number 1, and tiles corresponding to a field of view area have serial numbers 2 to 10, when obtaining the tile 1 corresponding to the positioning result and the tiles 2 to 10 corresponding to the field of view area, the client loads the obtained tiles to the internal memory space.

In an embodiment, because a location of a user or a location of a virtual object controlled by a user in a game changes, a positioning result is updated in real time, a corresponding tile is loaded into an internal memory space, the internal memory space of a host terminal is limited (particularly, a mobile terminal), and an internal memory overflow problem may be caused. Therefore, when a clearing condition of the internal memory space is satisfied, some tiles in the internal memory space are cleared, until an idle internal memory space used for loading the tile corresponding to the positioning result and the tile corresponding to the field of view area is formed.

In an embodiment, the satisfying a clearing condition of the internal memory space includes: determining, when tiles stored in the internal memory space reach a preset capacity or proportion or when the updated positioning result is detected, that the clearing condition of the internal memory space is satisfied.

In an embodiment, the map data processing method further includes a step of clearing some tiles in the internal memory space, and the step specifically includes: clearing some tiles in the internal memory space when a clearing condition of the internal memory space is satisfied, until an idle internal memory space used for loading the tile corresponding to the positioning result and the tile corresponding to the field of view area is formed.

The following clearing manners may be used for clearing some tiles in the internal memory space:

Clearing manner 1: clearing is performed according to an active area.

In an embodiment, the step of clearing some tiles in the internal memory space includes: determining an active area, where the active area includes the updated positioning result, the field of view area and a neighboring area of the field of view area; and clearing a tile of an inactive area in the internal memory space.

In an embodiment, first, the area corresponding to the updated positioning result, the field of view area and the neighboring area of the field of view area are determined according to the updated positioning result, the determined areas are classified as an active area, and an area exceeding the determined areas is classified as an inactive area; and then, in the internal memory space, a tile belonging to the inactive area is cleared. Because a location of a user or a virtual object in a game is updated, the foregoing active area is also correspondingly updated and changed; when a positioned object is the user, the active area is a real active area of the user; and when a positioned object is the virtual object in the game, the active area is an active area of the virtual object in a virtual three-dimensional space.

For example, when positioning or navigation is performed by using a conventional intelligent electronic device, a map picture is usually presented at a third angle of view. As shown in FIG. 6, when a user advances along a direction of an arrow D, a positioning result corresponds to a tile 1, a field of view area corresponds to tiles 2 to 9, and a neighboring area corresponds to tiles 10 to 18, where the neighboring area may be a direct neighboring area or an indirect neighboring area. Therefore, an active area corresponds to tiles 1 to 18, and tiles other than the tiles 1 to 18 are cleared, that is, tiles 19 to 21 are cleared.

Figures 7, 8:
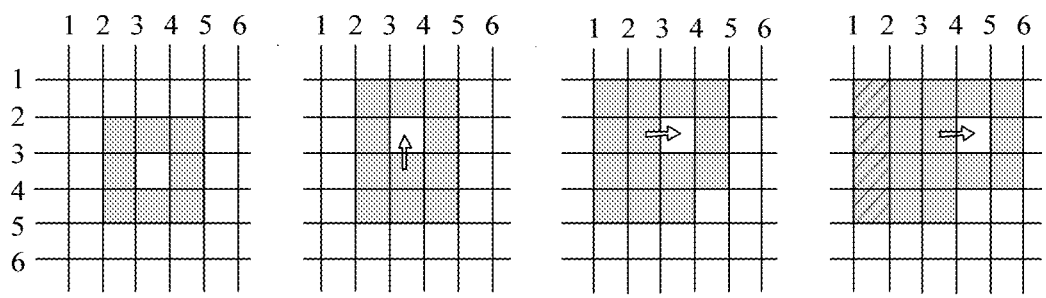
FIG. 7 is another schematic diagram of loading and deleting a tile according to an embodiment of this application.
FIG. 8 is still another schematic diagram of loading and deleting a tile according to an embodiment of this application.

For another example, when positioning or navigation is performed by using an AR/VR device, a map picture is usually presented at a first angle of view. As shown in FIG. 7, when a user advances along a direction of an arrow E, a positioning result corresponds to a tile 1, a field of view area corresponds to tiles 2 to 16, and a neighboring area of the field of view area corresponds to tiles 17 to 32, where the neighboring area may be a direct neighboring area or an indirect neighboring area, for example, a distance. Therefore, an active area corresponds to tiles 1 to 32, and tiles other than the tiles 1 to 32 are cleared, that is, tiles 33 to 35 are cleared. When a user performs positioning or navigation by using an AR/VR device, because of an actual requirement, the user and the carried AR/VR device may turn to the left or right to a relatively large extent, and therefore a corresponding tile is obtained according to a change in a field of view area, thereby performing map display.

Herein, the deleting policy in this embodiment of this application continues to be further stated. When a tile is loaded, because a field of view of a person is limited, only tiles on a current location block and within a surrounding area of n×n (that is, tiles of an active area) need to be loaded. Moreover, to avoid a phenomenon that the internal memory space is insufficient because tiles are continuously loaded, tiles beyond a preset range need to be dynamically deleted. A policy used herein is to delete tiles beyond (n+1)×(n+1) of a current block (that is, tiles of an inactive area). For example, when n=3, as shown in FIG. 8, a gray unit block with oblique lines is a deleted block, a gray unit block without oblique lines is loaded map data, a white unit block to which an arrow points is a current block, and blocks beyond 4×4 of the current block are to be deleted. n+1 is taken as a deleting range to avoid a case in which a tile at an edge is frequently requested and deleted because a round trip is made at an edge zone of two tiles.

Herein, FIG. 8 in the embodiments of this application continues to be introduced, a first picture on the left is a picture that just begins to be loaded, and only 3×3 map blocks around a current target object are displayed; in a second picture on the left, a target object moves upward in the picture, and when the target object moves to a particular orientation, map blocks are updated, unit blocks between the first row and the second row in the figure are updated map blocks, and 4×3 map blocks in the picture are reserved; in a third picture on the left, a target object moves to the right in the picture, and because three units are loaded each time, data of unit blocks in the fourth column and the fifth column is loaded; and in a fourth picture on the left, a target object moves to the right in the picture, and because three units are loaded each time, when the target object moves to a particular orientation, data of unit blocks in the fifth column and the sixth column is loaded, and unit blocks in the first column and the second column are to be deleted. In the four sub-pictures in FIG. 8, each sub-picture on the right is formed through motion based on a sub-picture on the left.

Clearing manner 2: clearing is performed according to a distance from the positioning result.

In an embodiment, tiles of a non-field of view area in the internal memory space are cleared in order from far to near relative to the updated positioning result, until the idle internal memory space used for loading the tile corresponding to the positioning result and the tile corresponding to the field of view area is formed.

For example, as shown in FIG. 6, a positioning result of a user corresponds to a tile 1, and a field of view area corresponds to tiles 2 to 9. Therefore, farthest tiles include tiles 10 to 21. Herein, because it is judged that a direction of the user is changed from a direction from A6 to A1 to a direction from B1 to B6, the field of view area is enlarged to enlarge a front field of view. Therefore, tiles 10 to 12 are placed in the field of view area, and reserved. Therefore, the loaded tiles 13 to 21 are cleared, thereby forming the idle internal memory space used for loading the tile corresponding to the positioning result and the tile corresponding to the field of view area.

Clearing manner 3: clearing is performed according to a field of view.

In an embodiment, tiles, in the internal memory space, belonging to the field of view of the current positioning result are determined based on the latest (current) positioning result, and tiles beyond the field of view are sequentially cleared in order from far to near, until a sufficient idle internal memory space used for loading tiles matching the current field of view is formed in the internal memory space.

For example, when performing positioning or navigation by using such an AR device as intelligent glasses, a user performs positioning and tracking through a global positioning system disposed in the intelligent glasses, and a 3D electronic map corresponding to a positioning result is displayed on the intelligent glasses. Because the field of view of the user is limited, the user can see only a thing in front at a particular distance. Therefore, a tile corresponding to the current field of view and a tile beyond the current field of view are determined according to a relationship between the current field of view and a historical positioning result, data within the field of view is kept in an internal memory space, and data beyond the field of view is cleared, thereby forming an idle internal memory space used for loading a tile matching the current field of view. Moreover, in addition to performing positioning and tracking by using the global positioning system disposed in the intelligent glasses, positioning may be further performed through a device such as a mobile phone carried by the user or a positioning system of an in-vehicle system, and the positioning result is transmitted to the intelligent glasses in a Bluetooth, Near Field Communication (NFC) or Wireless Fidelity (Wi-Fi) manner.

For another example, the user may alternatively perform positioning or navigation in a regular manner, for example, by using a mobile phone or an in-vehicle navigation system. For the mobile phone or the in-vehicle navigation system, the field of view in a displayed three-dimensional picture may be adjusted or controlled by touching a display screen of the mobile phone or the in-vehicle navigation system, or may be correspondingly adjusted with the positioning result by default. Therefore, a tile corresponding to the current field of view and a tile beyond the current field of view may alternatively be determined according to a relationship between a historical positioning result and the field of view displayed on the display screen of the mobile phone or the in-vehicle navigation system, data within the field of view is kept in an internal memory space, and data beyond the field of view is cleared, thereby forming an idle internal memory space used for loading a tile matching the current field of view.

In an embodiment, data in the internal memory space is cleared, or some tiles stored earliest in the internal memory space may be cleared in a storage order.

For example, when the client is run, to improve running efficiency and reduce consumption of the internal memory space, data not to be used anymore is appropriately cleared. Generally, when a user is in a navigation process, because the user continuously moves, map data earliest loaded to the internal memory space may be not used by the user anymore. Therefore, some tiles stored earliest in the internal memory space may be cleared in a storage order.

Step 305: Render, based on the loaded tiles, an image, in the three-dimensional space, located on the positioning result and corresponding to the field of view area.

In an embodiment, the step of rendering, based on the loaded tiles, an image, in the three-dimensional space, located on the positioning result and corresponding to the field of view area includes: generating, according to geometrical attributes of map elements included in the tiles, a mesh corresponding to the geometrical attributes, and generating, according to the mesh, an image of the map elements having the corresponding geometrical attributes; and rendering the image of the map elements to a corresponding location in the three-dimensional space.

The implementation of rendering an image in the three-dimensional space according to tiles is described below. In an embodiment, a tile includes information about an object having a geometrical attribute. Therefore, in a rendering process, geometrical attribute types to which object information belongs is determined, and the geometrical attribute types include a point, a line and a plane; meshes corresponding to the geometrical attribute types are generated, and object information of the geometrical attribute types is converted into corresponding geometrical objects according to the meshes; and the geometrical objects are placed on corresponding locations in the three-dimensional space, to form an image, in the three-dimensional space, located on an updated positioning result.

Figure 9:
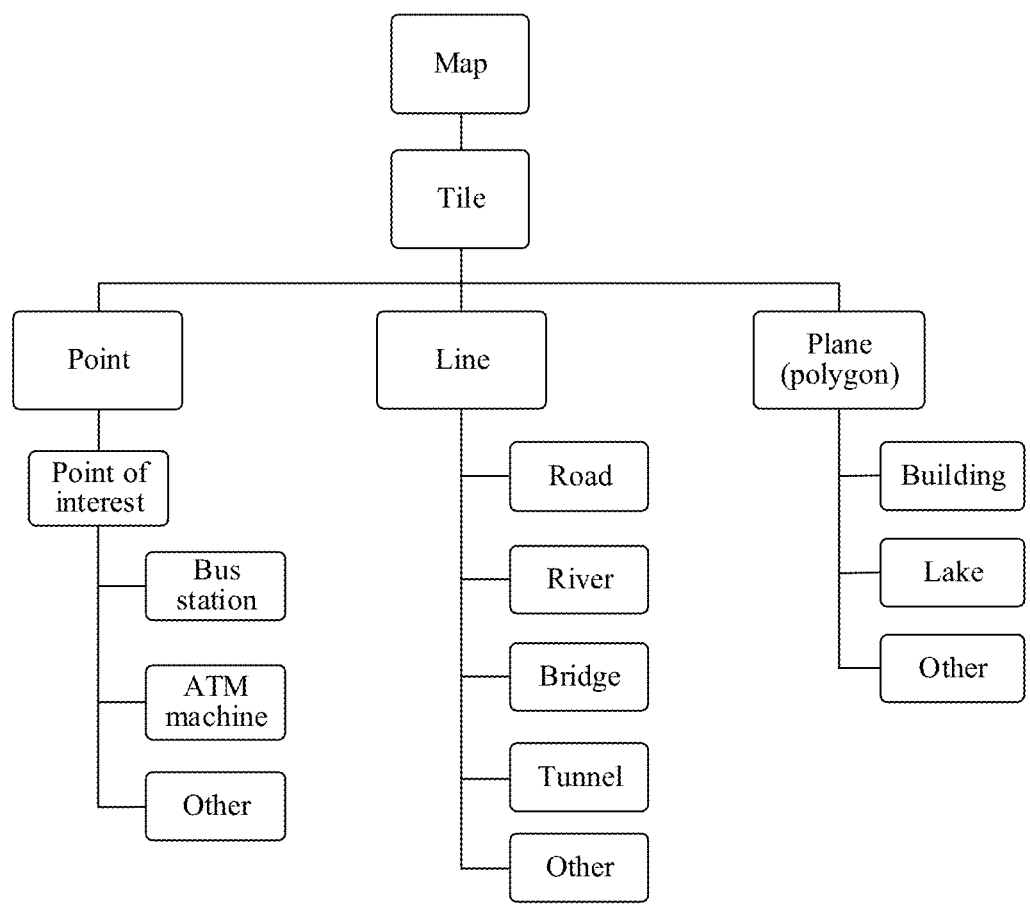
FIG. 9 is a schematic diagram of geometrical attributes of map elements according to an embodiment of this application.

As shown in FIG. 9, an electronic map includes tiles of regions, where map data in the tiles is reflected in forms of point, line and plane.

1. Map data for a point includes only one piece of geometrical information, that is, longitude and latitude of the point. Through conversion, a corresponding point on a map may generate a corresponding object, for example, a bus station or a cafe.

2. Geometrical information of map data for a line mainly corresponds to a road, a river, a metro or the like. Using a road as an example, a segment of road includes a plurality of line segments, one quadrangle along a line segment direction may be generated for each line segment according to the width of the road, a plurality of quadrangles are combined into one polygon, a mesh including the foregoing set information is generated, UV texture map coordinates and material balls are attached, and then rendering is performed.

3. Geometrical information of map data for a plane (or a polygon) mainly corresponds to a building, a lake or the like, a plane-related map substance is generated, and a corresponding mesh such as a building or a lake may be generated directly according to vertex data and the height of the polygon, and is placed on a corresponding location on the map.

Herein, the mesh in the embodiments of this application continues to be stated, and the mesh is a component in a unity, and is referred to as a mesh component, and the unity includes: a mesh, a mesh filter and a mesh renderer.

Mesh: main attribute content of the mesh includes vertex coordinates, a normal, texture coordinates, a triangular drawing sequence and other useful attributes and functions.

Mesh Filter: it includes a mesh component that may be a component for obtaining a model mesh according to the mesh filter and may also set mesh content for the mesh filter.

Mesh Renderer: it is a component used for rendering a mesh, and the mesh renderer draws and displays a mesh model transmitted by the mesh filter.

For different devices, in different application scenarios, rendering angles of map pictures are all different. For different angle of view rendering, there may be the following three scenarios:

Scenario 1: First angle of view.

In an embodiment, angle of view rendering is performed based on tiles, in the internal memory space, matching the updated positioning result and the field of view area, to form an image displayed at the first angle of view.

For example, in a three-dimensional electronic map navigation application or some online or offline games, to observe each subtle operation of an operator, a picture is usually presented at the first angle of view, that is, an objective thing is observed or described at an angle at which a narrator personally sees with his/her own eyes. Therefore, in a rendering process, using the first angle of view as a reference, a tile of a positioning result is rendered, to form an image, in the three-dimensional space, that is located on the updated positioning result and displayed at the first angle of view.

Scenario 2: Third angle of view.

In an embodiment, angle of view rendering is performed based on tiles, in the internal memory space, matching the updated positioning result and the field of view area, to form an image displayed at the third angle of view.

For example, to observe the whole body of a game role in a game and an environment around the game role, or see a location of oneself and a surrounding environment in a map software picture, in a rendering process, using the third angle of view as a reference, a tile of a positioning result is rendered, to form an image, in the three-dimensional space, that is located on the updated positioning result and displayed at the third angle of view.

Scenario 3: Superimpose thumbnails at a first angle of view and a third angle of view.

In an embodiment, angle of view rendering is performed based on tiles, in the internal memory space, matching the updated positioning result and the field of view area, to form an image displayed by superimposing the thumbnails at the first angle of view and the third angle of view.

For example, in a three-dimensional electronic map navigation application or some online or offline games, if an operator not only intends to observe each subtle operation of the operator, but also intends to observe the whole body of a game role in a game and an environment around the game role or see a location of oneself and a surrounding environment in a map software picture, in a rendering process, using the first angle of view as a reference and using the third angle of view as an auxiliary reference, a tile of a positioning result is rendered, to form an image, in the three-dimensional space, that is located on an updated positioning result and displayed by superimposing the thumbnails at the first angle of view and the third angle of view.

Step 306: The client sets a dynamic attribute in a map element in a tile.

In an embodiment, when the updated positioning result and map elements in the three-dimensional space satisfy a predetermined location condition, a dynamic effect located at the positioning result is outputted according to dynamic attributes that are set in the map elements in the tiles. Herein, the dynamic effect needs to be set by using the foregoing object layer, where the object layer is used for adding information about map elements other than the background, for example, a dynamic special effect of a prop or a barrier, so that when a positioning result of a virtual object is updated, interaction with the virtual object can be achieved.

For example, through the object layer, settings of some elements in a tile may self-define a style of a city, for example, a building, a road, a river effect, and a point of interest information presentation manner. Therefore, for setting of a dynamic effect, a corresponding dynamic effect may be set for a building and a river in a map. For example, a collision effect is set for a building, a tall and big barrier or the like in a map, and a water submergence effect is set for an area such as a river or a pool in the map.

During actual application, a corresponding dynamic effect module is set for a corresponding area in a map, and a corresponding dynamic effect is generated through the set module. This is described as follows:

1. For a collision effect:

In an embodiment, a collision effect module is set for a barrier area in a map. When it is detected that a virtual object in a client is about to enter the barrier area, for example, a building or a tall and big barrier, the collision effect module in the barrier area is triggered, and a collision effect is generated through the collision effect module, that is, the virtual object is prohibited from passing through a barrier corresponding to a barrier module in a virtual three-dimensional space.

Figure 10:
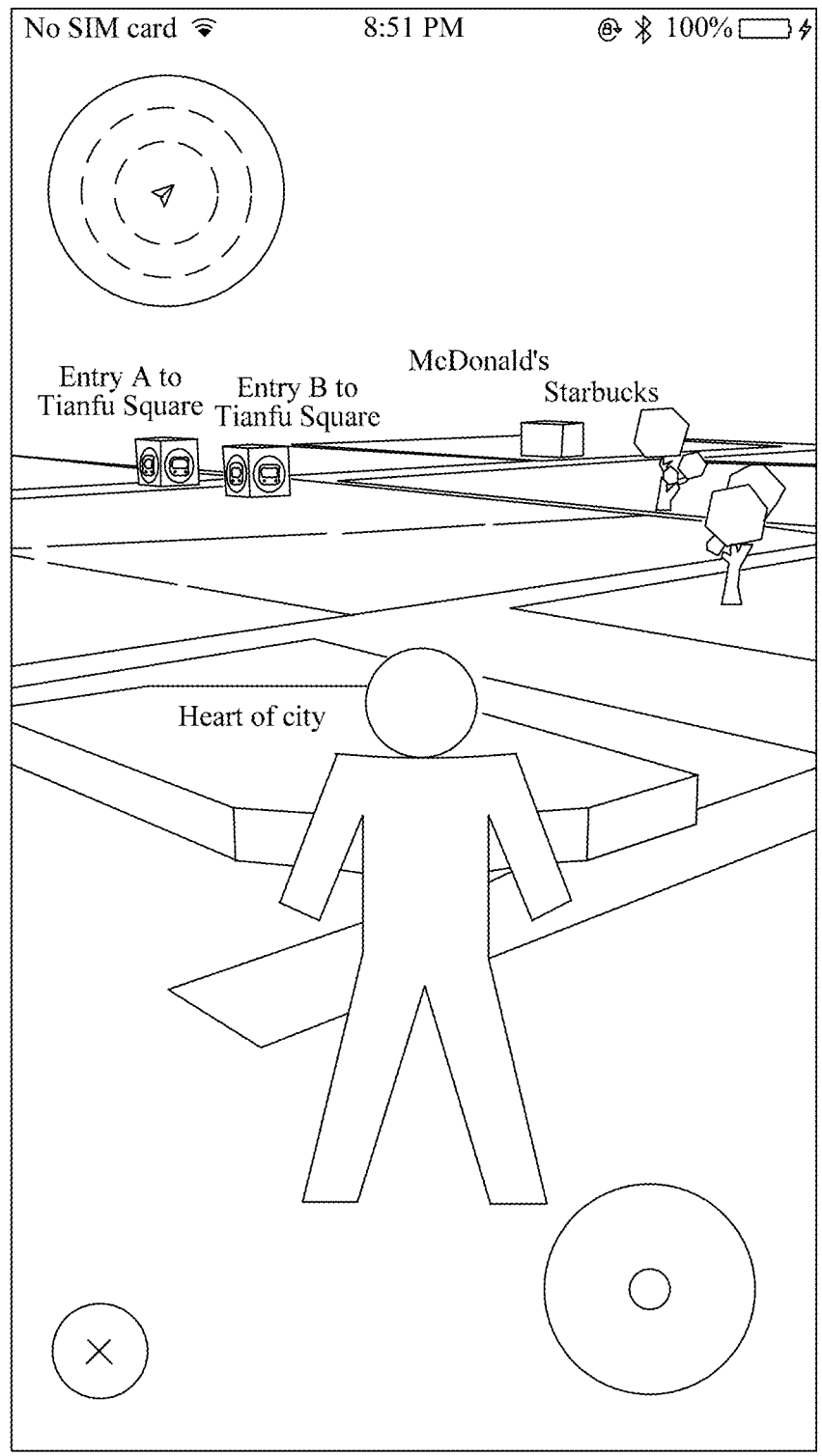
FIG. 10 is a schematic diagram of navigation at a third angle of view according to an embodiment of this application.

As shown in FIG. 10, according to a motion situation of a user, a role in a picture may walk freely in a map. When the user encounters a building, correspondingly, a virtual character, in a client, corresponding to the user is also blocked and cannot advance; or when the user plays a game by using an AR or VR device, a virtual character in the game cannot advance when encountering a building.

2. For a water submergence effect:

In an embodiment, a water submergence effect module is set for a water area in a map. When it is detected that a virtual object in a client enters a water area, for example, a pool or a river, the water submergence effect module in the water area is triggered, and a water submergence effect is generated through the water submergence effect module, that is, a coordinate height of a virtual object in a virtual three-dimensional space is adjusted.

Figure 11:
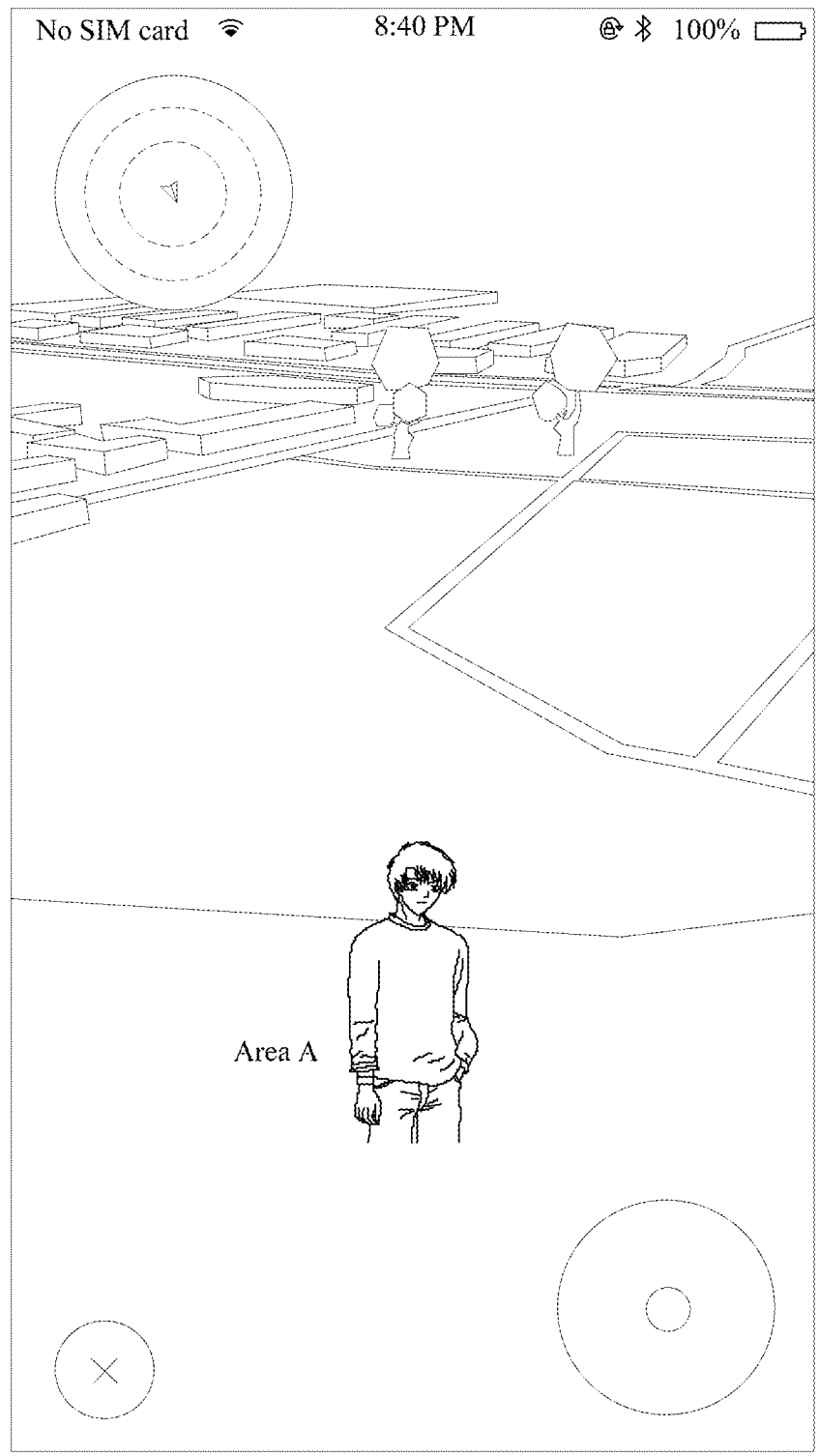
FIG. 11 is another schematic diagram of navigation at a third angle of view according to an embodiment of this application.

As shown in FIG. 11, according to a motion situation of a user, a role in a picture may walk freely and interact in a map. For example, when the user enters a pool or a river, correspondingly, a virtual character, in a client, corresponding to the user also stimulates a state of water submergence. That is, in a map picture in the client, the virtual character enters a virtual pool or river, and water in the pool or river submerges a particular part of the virtual character, for example, knees, for example, the virtual character shown in FIG. 11 enters an area A (water area); or when the user plays a game by using an AR or VR device, a virtual character in the game enters a pool or a river, to be in a state of water submergence.

Moreover, angle of views of pictures in FIG. 10 and FIG. 11 may be further rotated freely, to observe the map pictures by 360 degrees. FIG. 10 and FIG. 11 are displayed at the third angle of view. If navigation is real, a virtual role in a picture represents a user himself or herself.

FIG. 3 is a schematic flowchart of a method according to an embodiment of this application. It is to be understood that although the steps in the flowchart in FIG. 3 are sequentially shown according to indication of an arrow, the steps are not necessarily sequentially performed according to a sequence indicated by the arrow. Unless explicitly specified in this application, a performing sequence of the steps is not strictly limited, and the steps may be performed in other sequences. Besides, at least some steps in FIG. 3 may include a plurality of sub-steps or a plurality of stages, the sub-steps or stages are not necessarily performed at a same moment and may be performed at different moments, the sub-steps or stages are not necessarily sequentially performed, and the sub-steps or stages and at least some of other steps or sub-steps or stages of other steps may be performed in turn or alternately.

Figure 12:
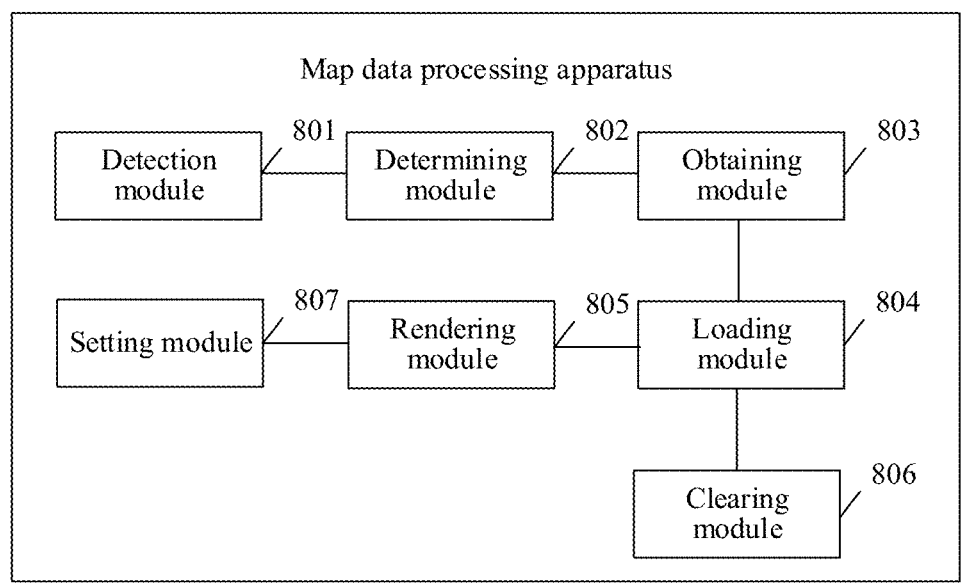
FIG. 12 is a schematic diagram of a composition structure of a map data processing apparatus according to an embodiment of this application.

An embodiment of the present disclosure further provides a map data processing apparatus. FIG. 12 is a schematic diagram of an optional function structure of a map data processing apparatus 800 provided in an embodiment of the present disclosure, including: a detection module 801, a determining module 802, an obtaining module 803, a loading module 804, a rendering module 805, a clearing module 806 and a setting module 807. Functions of the modules are described below.

The detection module 801 is configured to detect a positioning result updated in a three-dimensional space.

The determining module 802 is configured to determine a field of view area corresponding to the updated positioning result.

The obtaining module 803 is configured to obtain a tile corresponding to the updated positioning result and a tile corresponding to the field of view area.

The loading module 804 is configured to dynamically load, into an internal memory space, the tile corresponding to the updated positioning result, and the tile corresponding to the field of view area.

The rendering module 805 is configured to render, based on the loaded tiles, an image, in the three-dimensional space, located on the positioning result and corresponding to the field of view area.

In an embodiment, the detection module 801 is specifically configured to: invoke a positioning service to detect a positioning result, in a real three-dimensional space, of a host device of a client at a fixed time interval; or to detect a positioning result, in a virtual three-dimensional space, of a virtual object in a client at a fixed time interval.

In an embodiment, the determining module 802 is specifically configured to: determine, by using the positioning result as a reference in the three-dimensional space, a field of view area that is located at a preset angle of view and whose distance from the positioning result is less than a predetermined distance; or determine, by using the positioning result as a center in the three-dimensional space, a field of view area whose distance from the positioning result is less than a predetermined distance.

In an embodiment, the obtaining module 803 is specifically configured to: request the tile corresponding to the updated positioning result and the tile corresponding to the field of view area from a tile database when the updated positioning result is detected for the first time; and query the internal memory space for the tiles when the updated positioning result is the same as a historical positioning result, and request the tile corresponding to the updated positioning result and the tile corresponding to the field of view area from the tile database when no tile is found.

In an embodiment, the clearing module 806 is configured to clear some tiles in the internal memory space when a clearing condition of the internal memory space is satisfied, until an idle internal memory space used for loading the tile corresponding to the positioning result and the tile corresponding to the field of view area is formed.

In an embodiment, the clearing module 806 is specifically configured to: determine an active area, where the active area includes the updated positioning result, the field of view area and a neighboring area of the field of view area; and clear a tile of an inactive area in the internal memory space.

In an embodiment, the clearing module 806 is specifically configured to: clear tiles of a non-field of view area in the internal memory space in order from far to near relative to the updated positioning result, until the idle internal memory space used for loading the tile corresponding to the positioning result and the tile corresponding to the field of view area is formed.

In an embodiment, the clearing module 806 is specifically configured to: determine, when tiles stored in the internal memory space reach a preset capacity or proportion or when the updated positioning result is detected, that the clearing condition of the internal memory space is satisfied.

In an embodiment, the rendering module 805 is specifically configured to: generate, according to geometrical attributes of map elements included in the tiles, a mesh corresponding to the geometrical attributes, and generate, according to the mesh, an image of the map elements having the corresponding geometrical attributes; and render the image of the map elements to a corresponding location in the three-dimensional space.

In an embodiment, the setting module 807 is configured to: when the updated positioning result and map elements in the three-dimensional space satisfy a predetermined location condition, output, according to dynamic attributes that are set in the map elements in the tiles, a dynamic effect located at the positioning result.

During actual application, each of the detection module 801, the determining module 802, the obtaining module 803, the loading module 804, the rendering module 805, the clearing module 806 and the setting module 807 may be implemented by a central processing unit (CPU), a microprocessor unit (MPU), a digital signal processor (DSP), a field-programmable gate array (FPGA) or the like located in the map data processing apparatus.

Figure 13:
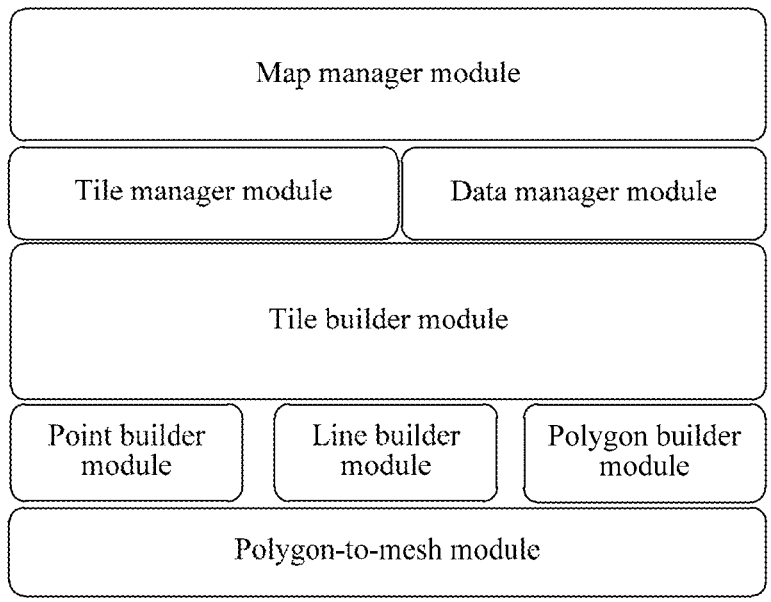
FIG. 13 is a schematic diagram of a composition structure of another map data processing apparatus according to an embodiment of this application.

An embodiment of this application further provides another map data processing apparatus. FIG. 13 is a schematic diagram of a composition structure of another map data processing apparatus according to an embodiment of this application, including the following modules:

A map manager (MapManager) module is configured to generate a map, and manage a map pattern and the like.

A tile manager (TileManager) module is configured to manage generation and destruction of a map tile.

A data manager (DataManager) module is configured to be responsible for reading map data, including obtaining from a server and reading from or writing to a local cache.

A tile builder (TileBuilder) module is configured to be responsible for parsing the map data and invoking a point builder module, a line builder module, and a polygon builder module at a lower level, to generate various elements on the map.

A polygon-to-mesh (Poly2mesh) module used as a geometrical module at a bottom layer and mainly combined with a mesh-related API of Unity3D is responsible for converting discrete point data of the map into a visual mesh file.

For each of current mainstream map APIs, a terminal requests an area, a server returns a rendered picture, and picture downloading needs to consume a relatively large quantity of traffic. Moreover, because a map service provider does not provide underlying data of a map to a user, the terminal cannot perform excessive self-defined modification on the map. In addition, most existing maps are 2D, and even if there is a three-dimensional building, the building is pseudo 3D, and cannot be rotated freely by 360 degrees and watched. Therefore, the embodiments of this application provide a solution.

Figure 14:
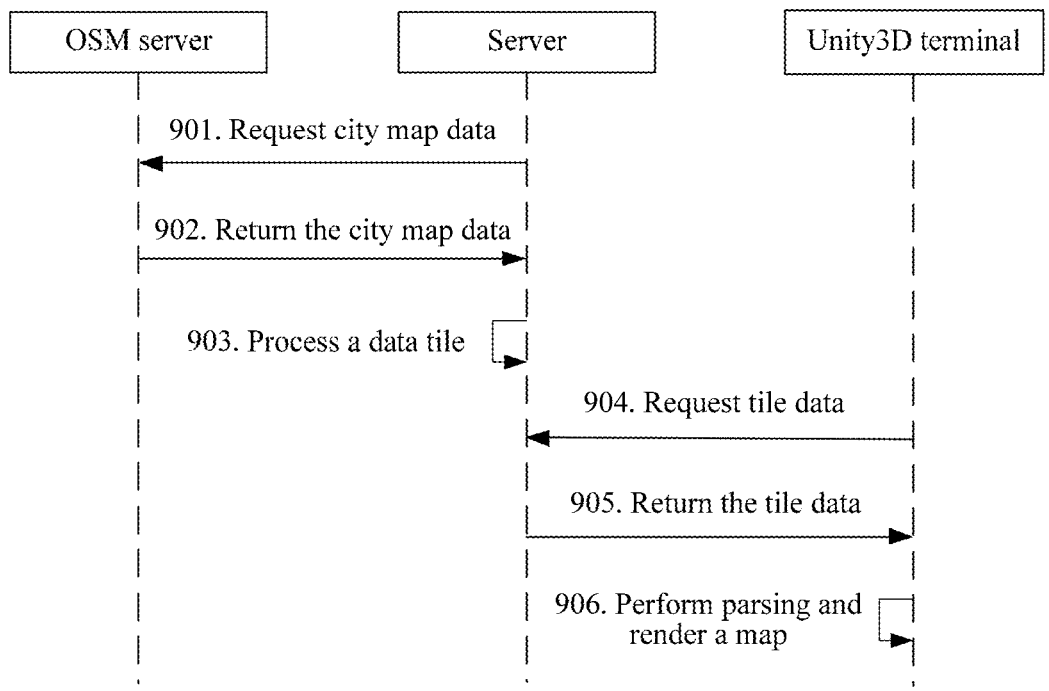
FIG. 14 is a schematic implementation flowchart of another map data processing method according to an embodiment of this application.

FIG. 14 is a schematic implementation flowchart of another map data processing method according to an embodiment of this application, including the following operations:

Step 901: A server obtains city map data from an OSM server.

An OSM is a free, open-source, and editable map service jointly built by cyber citizens. Therefore, during actual positioning or navigation, the map data obtained from the OSM server may be edited and self-defined by a user according to an actual requirement through a conventional intelligent electronic device or an AR/VR device.

Step 902: The OSM server returns the city map data to the server.

Step 903: The server performs parsing and tiling, and converts the data into vector tiles.

At this stage, feature information on a map, for example, a building, a road, a lake surface and a point of interest needs to be stored onto corresponding vector tiles according to a longitude and latitude and a scaling proportion, so that a terminal requests corresponding vector tile data when dynamically loading the map.

Step 904: A Unity3D terminal requests tile data from the server.

Herein, tile data matching a corresponding positioning result is transmitted to the server according to the positioning result in a three-dimensional space.

Step 905: The server returns the requested tile data to the Unity3D terminal.

Step 906: The Unity3D terminal performs parsing and renders a map.

Unity3D is a multi-platform comprehensive development tool for creating interactive content of types such as a three-dimensional video game, building visualization, and a real-time three-dimensional animation. Certainly, in the embodiments of this application, use of other forms of development tools is not excluded, and barriers and water areas are rendered in a 3D space, where the barriers such as a building and the water areas such as a river and a pool are map elements in tiles and are provided with different features during rendering, so that a virtual object, in a client, corresponding to a user freely interacts with an element on the map. For example, a mesh collider is set for a building. When a virtual object walks on a map and is close to a barrier such as a building, if the mesh collider is triggered, the virtual object collides with the building. As a result, the virtual object cannot pass through the building. Therefore, a rendering result is: the virtual character stops in front of the building. For another example, a mesh trigger is set for a water area. When a virtual object walks on a map, and enters a water area such as a river or a pool, if the mesh trigger is triggered, a location of the virtual object relative to the map changes, that is, a vertical coordinate of the virtual object moves downward relative to the horizontal plane. Therefore, a rendering result is: water in the water area is to submerge a part of the virtual object, for example, knees.

Moreover, during actual positioning or navigation, a user may mark a frequented supermarket, a frequented gas station and the like through a conventional intelligent electronic device or an AR/VR device, or add personalized settings to buildings of a frequented supermarket and a frequented gas station, for example, rendering the buildings in different colors, so as to enhance a visual effect.

In conclusion, the embodiments of this application may achieve the following beneficial effects:

1. A corresponding field of view area can be determined according to a positioning result, and when a user has a change in direction, an orientation of the user is quickly obtained according to the positioning result, and the field of view area of the user is determined according to the orientation, so as to quickly obtain a corresponding tile.

2. Classification of a tile corresponding to the positioning result and a tile corresponding to the field of view area helps perform classification processing on two types of tiles when the positioning result is updated, and facilitates management on the tiles.

3. For a case in which a tile is dynamically loaded into an internal memory space, a corresponding tile is obtained according to the updated positioning result, and when the tile is loaded into the internal memory space, some original tile data in the internal memory space is dynamically deleted, to ensure that map data is updated without changing internal memory consumption.

4. For a case in which an image of the updated positioning result is correspondingly dynamically formed, when the positioning result is updated and changed in real time, an image, in a three-dimensional space, located on the updated positioning result is formed, that is, a presented map picture is also updated in real time, to ensure that the field of view is kept consistent with the positioning result.

5. An obtained tile is text data in a JSON format, and a required data volume is greatly reduced.

6. Because tiles are obtained from the tile server and spliced and rendered, a vector map supports the client in performing corresponding self-definition modification on the map, and a three-dimensional map is autonomously rendered by using a Unity3D engine, a map pattern and a representation form of a map element can be highly self-defined.

7. When the map data is rendered, the map data may be provided with different features of map elements, so that a character freely interacts with an element on the map. For example, if it is detected that a character enters a river area, the client correspondingly renders an effect that a virtual object is submerged in a water area.

In an embodiment, a computer device is provided, including a memory and a processor, the memory storing computer-readable instructions, and the computer-readable instructions, when executed by the processor, causing the processor to perform the following operations: detecting a positioning result updated in a three-dimensional space; determining a field of view area corresponding to the updated positioning result; obtaining a tile corresponding to the updated positioning result and a tile corresponding to the field of view area; loading, into an internal memory space, the tile corresponding to the updated positioning result, and the tile corresponding to the field of view area; and rendering, based on the loaded tiles, an image, in the three-dimensional space, located on the positioning result and corresponding to the field of view area.

In an embodiment, the computer-readable instructions, when executed by the processor, cause the processor, when the operation of detecting a positioning result updated in a three-dimensional space is performed, to perform the following operation: invoking a positioning service to detect a positioning result, in a real three-dimensional space, of a host device of a client at a fixed time interval; or to detect a positioning result, in a virtual three-dimensional space, of a virtual object in a client at a fixed time interval.

In an embodiment, the computer-readable instructions, when executed by the processor, cause the processor, when the operation of determining a field of view area corresponding to the updated positioning result is performed, to perform the following operation: determining, by using the positioning result as a reference in the three-dimensional space, that an area that is located at a preset angle of view and whose distance from the positioning result is less than a predetermined distance is the field of view area; or determining, by using the positioning result as a center in the three-dimensional space, that an area whose distance from the positioning result is less than a predetermined distance is the field of view area.

In an embodiment, the computer-readable instructions, when executed by the processor, cause the processor, when the operation of obtaining a tile corresponding to the updated positioning result and a tile corresponding to the field of view area is performed, to perform the following operations: requesting the tile corresponding to the updated positioning result and the tile corresponding to the field of view area from a tile database when the updated positioning result is detected for the first time; and querying the internal memory space for the tiles when the updated positioning result is the same as a historical positioning result, and requesting the tile corresponding to the updated positioning result and the tile corresponding to the field of view area from the tile database when no tile is found.

In an embodiment, the computer readable instructions further cause the processor to perform the following operation: clearing some tiles in the internal memory space when a clearing condition of the internal memory space is satisfied, until an idle internal memory space used for loading the tile corresponding to the positioning result and the tile corresponding to the field of view area is formed.

In an embodiment, the computer-readable instructions, when executed by the processor, cause the processor, when the operation of clearing some tiles in the internal memory space is performed, to perform the following operations: determining an active area, where the active area includes the updated positioning result, the field of view area and a neighboring area of the field of view area; and clearing a tile of an inactive area in the internal memory space.

In an embodiment, the computer-readable instructions, when executed by the processor, cause the processor, when the operation of clearing some tiles in the internal memory space is performed, to perform the following operation: clearing tiles of a non-field of view area in the internal memory space in order from far to near relative to the updated positioning result, until the idle internal memory space used for loading the tile corresponding to the positioning result and the tile corresponding to the field of view area is formed.

In an embodiment, the computer readable instructions further cause the processor to perform the following operation: determining, when tiles stored in the internal memory space reach a preset capacity or proportion or when the updated positioning result is detected, that the clearing condition of the internal memory space is satisfied.

In an embodiment, the computer-readable instructions, when executed by the processor, cause the processor, when the operation of rendering, based on the loaded tiles, an image, in the three-dimensional space, located on the positioning result and corresponding to the field of view area is performed, to perform the following operations: generating, according to geometrical attributes of map elements included in the tiles, a mesh corresponding to the geometrical attributes, and generating, according to the mesh, an image of the map elements having the corresponding geometrical attributes; and rendering the image of the map elements to a corresponding location in the three-dimensional space.

In an embodiment, the computer readable instructions further cause the processor to perform the following operation: when the updated positioning result and map elements in the three-dimensional space satisfy a predetermined location condition, outputting, according to dynamic attributes that are set in the map elements in the tiles, a dynamic effect located at the positioning result.

A non-volatile computer-readable storage medium is provided, storing computer-readable instructions, the computer-readable instructions, when executed by one or more processors, causing the one or more processors to perform the following operations: detecting a positioning result updated in a three-dimensional space; determining a field of view area corresponding to the updated positioning result; obtaining a tile corresponding to the updated positioning result and a tile corresponding to the field of view area; loading, into an internal memory space, the tile corresponding to the updated positioning result, and the tile corresponding to the field of view area; and rendering, based on the loaded tiles, an image, in the three-dimensional space, located on the positioning result and corresponding to the field of view area.

In an embodiment, the computer-readable instructions, when executed by the processor, cause the processor, when the operation of detecting a positioning result updated in a three-dimensional space is performed, to perform the following operation: invoking a positioning service to detect a positioning result, in a real three-dimensional space, of a host device of a client at a fixed time interval; or to detect a positioning result, in a virtual three-dimensional space, of a virtual object in a client at a fixed time interval.

In an embodiment, the computer-readable instructions, when executed by the processor, cause the processor, when the operation of determining a field of view area corresponding to the updated positioning result is performed, to perform the following operation: determining, by using the positioning result as a reference in the three-dimensional space, that an area that is located at a preset angle of view and whose distance from the positioning result is less than a predetermined distance is the field of view area; or determining, by using the positioning result as a center in the three-dimensional space, that an area whose distance from the positioning result is less than a predetermined distance is the field of view area.

In an embodiment, the computer-readable instructions, when executed by the processor, cause the processor, when the operation of obtaining a tile corresponding to the updated positioning result and a tile corresponding to the field of view area is performed, to perform the following operations: requesting the tile corresponding to the updated positioning result and the tile corresponding to the field of view area from a tile database when the updated positioning result is detected for the first time; and querying the internal memory space for the tiles when the updated positioning result is the same as a historical positioning result, and requesting the tile corresponding to the updated positioning result and the tile corresponding to the field of view area from the tile database when no tile is found.

In an embodiment, the computer readable instructions further cause the processor to perform the following operation: clearing some tiles in the internal memory space when a clearing condition of the internal memory space is satisfied, until an idle internal memory space used for loading the tile corresponding to the positioning result and the tile corresponding to the field of view area is formed.

In an embodiment, the computer-readable instructions, when executed by the processor, cause the processor, when the operation of clearing some tiles in the internal memory space is performed, to perform the following operations: determining an active area, where the active area includes the updated positioning result, the field of view area and a neighboring area of the field of view area; and clearing a tile of an inactive area in the internal memory space.

In an embodiment, the computer-readable instructions, when executed by the processor, cause the processor, when the operation of clearing some tiles in the internal memory space is performed, to perform the following operation: clearing tiles of a non-field of view area in the internal memory space in order from far to near relative to the updated positioning result, until the idle internal memory space used for loading the tile corresponding to the positioning result and the tile corresponding to the field of view area is formed.

In an embodiment, the computer readable instructions further cause the processor to perform the following operation: determining, when tiles stored in the internal memory space reach a preset capacity or proportion or when the updated positioning result is detected, that the clearing condition of the internal memory space is satisfied.

In an embodiment, the computer-readable instructions, when executed by the processor, cause the processor, when the operation of rendering, based on the loaded tiles, an image, in the three-dimensional space, located on the positioning result and corresponding to the field of view area is performed, to perform the following operations: generating, according to geometrical attributes of map elements included in the tiles, a mesh corresponding to the geometrical attributes, and generating, according to the mesh, an image of the map elements having the corresponding geometrical attributes; and rendering the image of the map elements to a corresponding location in the three-dimensional space.

In an embodiment, the computer readable instructions further cause the processor to perform the following operation: when the updated positioning result and map elements in the three-dimensional space satisfy a predetermined location condition, outputting, according to dynamic attributes that are set in the map elements in the tiles, a dynamic effect located at the positioning result.

The foregoing descriptions are merely preferred embodiments of this application and are not intended to limit the protection scope of this application. Any modification, equivalent replacement, or improvement made within the spirit and scope of this application falls within the protection scope of this application.

What is claimed is:

1. A map data processing method, performed in a computing device having one or more processors and memory storing a plurality of programs to be executed by the one or more processors, the method comprising:
    detecting a positioning result updated in a three-dimensional space;
    in accordance with a determination that the updated positioning result exceeds a predefined region, the predefined region corresponding to a previous positioning result before the updated positioning result:
        determining a field of view area corresponding to the updated positioning result;
        obtaining a tile corresponding to the updated positioning result and a tile corresponding to the field of view area, wherein the tile comprises map data;
        loading, into an internal memory space, the tile corresponding to the updated positioning result, and the tile corresponding to the field of view area;
        rendering, based on the loaded tiles, an image, in the three-dimensional space, located on the positioning result and corresponding to the field of view area; and
    in accordance with a determination that a clearing condition of the internal memory space is satisfied:
        clearing some tiles in the internal memory space, including clearing a tile of an inactive area in the internal memory space.

2. The method according to claim 1, wherein the detecting a positioning result updated in a three-dimensional space comprises:
    invoking a positioning service to detect a positioning result, in a real three-dimensional space, of a host device of a client at a fixed time interval; or
    detecting a positioning result, in a virtual three-dimensional space, of a virtual object in a client at a fixed time interval.

3. The method according to claim 1, wherein the determining a field of view area corresponding to the updated positioning result comprises:
    determining, by using the positioning result as a reference in the three-dimensional space, that an area that is located at a preset angle of view and whose distance from the positioning result is less than a predetermined distance is the field of view area; or
    determining, by using the positioning result as a center in the three-dimensional space, that an area whose distance from the positioning result is less than a predetermined distance is the field of view area.

4. The method according to claim 1, wherein the obtaining a tile corresponding to the updated positioning result and a tile corresponding to the field of view area comprises:
    requesting the tile corresponding to the updated positioning result and the tile corresponding to the field of view area from a tile database in response to detecting the updated positioning result for the first time; and
    querying the internal memory space for the tiles in response to determining that the updated positioning result is the same as a historical positioning result, and requesting the tile corresponding to the updated positioning result and the tile corresponding to the field of view area from the tile database in response to finding no tile.

5. The method according to claim 1, wherein tiles in the internal memory space are cleared until an idle internal memory space used for loading the tile corresponding to the positioning result and the tile corresponding to the field of view area is formed.

6. The method according to claim 5, wherein the clearing some tiles in the internal memory space comprises:
determining an active area, wherein the active area comprises the updated positioning result, the field of view area and a neighboring area of the field of view area.

7. The method according to claim 5, wherein the clearing some tiles in the internal memory space comprises:
clearing tiles of a non-field of view area in the internal memory space in order from far to near relative to the updated positioning result, until the idle internal memory space used for loading the tile corresponding to the positioning result and the tile corresponding to the field of view area is formed.

8. The method according to claim 5, further comprising:
determining, in response to determining that tiles stored in the internal memory space reach a preset capacity or proportion or in response to determining that the updated positioning result is detected, that the clearing condition of the internal memory space is satisfied.

9. The method according to claim 1, wherein the rendering, based on the loaded tiles, an image, in the three-dimensional space, located on the positioning result and corresponding to the field of view area comprises:
generating, according to geometrical attributes of map elements comprised in the tiles, a mesh corresponding to the geometrical attributes, and generating, according to the mesh, an image of the map elements having the corresponding geometrical attributes; and
rendering the image of the map elements to a corresponding location in the three-dimensional space.

10. The method according to claim 1, further comprising:
outputting, according to dynamic attributes that are set in map elements in the tiles, a dynamic effect located at the positioning result, in response to determining that the updated positioning result and map elements in the three-dimensional space satisfy a predetermined location condition.

11. A computing device, comprising one or more processors, memory coupled to the one or more processors and a plurality of programs stored in the memory that, when executed by the one or more processors, cause the mobile terminal to perform a plurality of operations comprising:
detecting a positioning result updated in a three-dimensional space;
in accordance with a determination that the updated positioning result exceeds a predefined region, the predefined region corresponding to a previous positioning result before the updated positioning result:
determining a field of view area corresponding to the updated positioning result;
obtaining a tile corresponding to the updated positioning result and a tile corresponding to the field of view area, wherein the tile comprises map data;
loading, into an internal memory space, the tile corresponding to the updated positioning result, and the tile corresponding to the field of view area;
rendering, based on the loaded tiles, an image, in the three-dimensional space, located on the positioning result and corresponding to the field of view area; and
in accordance with a determination that a clearing condition of the internal memory space is satisfied:
clearing some tiles in the internal memory space, including clearing a tile of an inactive area in the internal memory space.

12. The computing device according to claim 11, wherein the detecting a positioning result updated in a three-dimensional space comprises:
invoking a positioning service to detect a positioning result, in a real three-dimensional space, of a host device of a client at a fixed time interval; or
detecting a positioning result, in a virtual three-dimensional space, of a virtual object in a client at a fixed time interval.

13. The computing device according to claim 11, wherein the determining a field of view area corresponding to the updated positioning result comprises:
determining, by using the positioning result as a reference in the three-dimensional space, that an area that is located at a preset angle of view and whose distance from the positioning result is less than a predetermined distance is the field of view area; or
determining, by using the positioning result as a center in the three-dimensional space, that an area whose distance from the positioning result is less than a predetermined distance is the field of view area.

14. The computing device according to claim 11, wherein the obtaining a tile corresponding to the updated positioning result and a tile corresponding to the field of view area comprises:
requesting the tile corresponding to the updated positioning result and the tile corresponding to the field of view area from a tile database in response to detecting the updated positioning result for the first time; and
querying the internal memory space for the tiles in response to determining that the updated positioning result is the same as a historical positioning result, and requesting the tile corresponding to the updated positioning result and the tile corresponding to the field of view area from the tile database in response to a determination that no tile is found.

15. The computing device according to claim 11, wherein tiles in the internal memory space are cleared until an idle internal memory space used for loading the tile corresponding to the positioning result and the tile corresponding to the field of view area is formed.

16. The computing device according to claim 11, wherein the rendering, based on the loaded tiles, an image, in the three-dimensional space, located on the positioning result and corresponding to the field of view area comprises:
generating, according to geometrical attributes of map elements comprised in the tiles, a mesh corresponding to the geometrical attributes, and generating, according to the mesh, an image of the map elements having the corresponding geometrical attributes; and
rendering the image of the map elements to a corresponding location in the three-dimensional space.

17. The computing device according to claim 11, wherein the plurality of operations further comprise:
outputting, according to dynamic attributes that are set in map elements in the tiles, a dynamic effect located at the positioning result, in response to a determination the updated positioning result and map elements in the three-dimensional space satisfy a predetermined location condition.

18. A non-transitory computer readable storage medium storing a plurality of machine readable instructions in connection with a computing device having one or more processors, wherein the plurality of machine readable instructions, when executed by the one or more processors, cause the computing device to perform a plurality of operations including:
　detecting a positioning result updated in a three-dimensional space;
　in accordance with a determination that the updated positioning result exceeds a predefined region, the predefined region corresponding to a previous positioning result before the updated positioning result:
　　determining a field of view area corresponding to the updated positioning result;
　　obtaining a tile corresponding to the updated positioning result and a tile corresponding to the field of view area;
　　loading, into an internal memory space, the tile corresponding to the updated positioning result, and the tile corresponding to the field of view area;
　　rendering, based on the loaded tiles, an image, in the three-dimensional space, located on the positioning result and corresponding to the field of view area; and
　in accordance with a determination that a clearing condition of the internal memory space is satisfied:
　　clearing some tiles in the internal memory space, including clearing a tile of an inactive area in the internal memory space.

19. The non-transitory computer readable storage medium according to claim 18, wherein the detecting a positioning result updated in a three-dimensional space comprises:
　invoking a positioning service to detect a positioning result, in a real three-dimensional space, of a host device of a client at a fixed time interval; or
　detecting a positioning result, in a virtual three-dimensional space, of a virtual object in a client at a fixed time interval.

20. The non-transitory computer readable storage medium according to claim 18, wherein the determining a field of view area corresponding to the updated positioning result comprises:
　determining, by using the positioning result as a reference in the three-dimensional space, that an area that is located at a preset angle of view and whose distance from the positioning result is less than a predetermined distance is the field of view area; or
　determining, by using the positioning result as a center in the three-dimensional space, that an area whose distance from the positioning result is less than a predetermined distance is the field of view area.

* * * * *